(12) United States Patent
Agarwal et al.

(10) Patent No.: US 12,282,509 B2
(45) Date of Patent: Apr. 22, 2025

(54) GENERATING VERIFIED CONTENT PROFILES FOR USER GENERATED CONTENT

(71) Applicant: Adeia Guides Inc., San Jose, CA (US)

(72) Inventors: Sukanya Agarwal, Haryana (IN); Srikanth Channapragada, Bangalore (IN); Saakshi Dhawan, Chandigarh (IN); Reda Harb, Tampa, FL (US); Vaishali Trivedi, Uttar Pradesh (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/644,960

(22) Filed: Apr. 24, 2024

(65) Prior Publication Data
US 2024/0273140 A1    Aug. 15, 2024

Related U.S. Application Data

(63) Continuation of application No. 18/113,784, filed on Feb. 24, 2023, now Pat. No. 11,995,123, which is a continuation of application No. 17/368,122, filed on Jul. 6, 2021, now Pat. No. 11,615,139.

(51) Int. Cl.
| | |
|---|---|
| *H04N 21/858* | (2011.01) |
| *G06F 16/732* | (2019.01) |
| *G06F 16/735* | (2019.01) |
| *G06F 16/78* | (2019.01) |
| *G06F 16/783* | (2019.01) |
| *H04N 21/443* | (2011.01) |

(52) U.S. Cl.
CPC ......... *G06F 16/735* (2019.01); *G06F 16/732* (2019.01); *G06F 16/7834* (2019.01); *G06F 16/7844* (2019.01); *G06F 16/7867* (2019.01); *H04N 21/4431* (2013.01); *H04N 21/858* (2013.01)

(58) Field of Classification Search
USPC ........................................ 386/241, 248, 278
See application file for complete search history.

(56) References Cited

U.S. PATENT DOCUMENTS

| | | | |
|---|---|---|---|
| 6,573,907 | B1 | 6/2003 | Madrane |
| 9,058,332 | B1 | 6/2015 | Darby et al. |
| 10,540,378 | B1 | 1/2020 | Hsiao et al. |
| 11,615,139 | B2 | 3/2023 | Agarwal et al. |
| 2002/0054083 | A1 | 5/2002 | Boreczky et al. |

(Continued)

*Primary Examiner* — Nigar Chowdhury

(74) *Attorney, Agent, or Firm* — Haley Guiliano LLP

(57) ABSTRACT

Systems and methods for searching, identifying, scoring, and providing access to companion media assets for a primary media asset are disclosed. In response to a request for companion content, metadata within a predefined time period of a play position when the request was made, is downloaded. A dynamic search template that contains search parameters based on the downloaded metadata is generated. In response to the search conducted using the search template, a plurality of companion media assets are identified and then verified. A trust score for the companion media asset is accessed. The trust score may be analyzed and modified based on its contextual relationship to the play position of the primary media asset. If the trust score is within a rating range, then a link to access the companion media asset, or a specific segment or play position within the companion media asset, is provided.

20 Claims, 12 Drawing Sheets

(56) References Cited

U.S. PATENT DOCUMENTS

| | | | |
|---|---|---|---|
| 2003/0028889 A1 | 2/2003 | McCoskey et al. | |
| 2003/0177503 A1 | 9/2003 | Sull et al. | |
| 2004/0064207 A1 | 4/2004 | Zacks et al. | |
| 2008/0298219 A1 | 12/2008 | Yamagata et al. | |
| 2013/0273968 A1 | 10/2013 | Rhoads et al. | |
| 2013/0283231 A1 | 10/2013 | Van Megchelen | |
| 2013/0294746 A1 | 11/2013 | Oz et al. | |
| 2014/0129493 A1 | 5/2014 | Leopold | |
| 2014/0355955 A1 | 12/2014 | Berger et al. | |
| 2016/0323334 A1 | 11/2016 | Saba | |
| 2018/0025003 A1 | 1/2018 | Marriott et al. | |
| 2021/0109986 A1 | 4/2021 | Rudden et al. | |
| 2021/0402511 A1* | 12/2021 | Kojima | B23K 26/03 |
| 2021/0402635 A1* | 12/2021 | Kojima | B26D 3/065 |
| 2022/0164378 A1 | 5/2022 | Daley et al. | |
| 2022/0391620 A1 | 12/2022 | Spiteri | |
| 2023/0009515 A1 | 1/2023 | Agarwal et al. | |
| 2023/0195785 A1 | 6/2023 | Agarwal et al. | |

\* cited by examiner

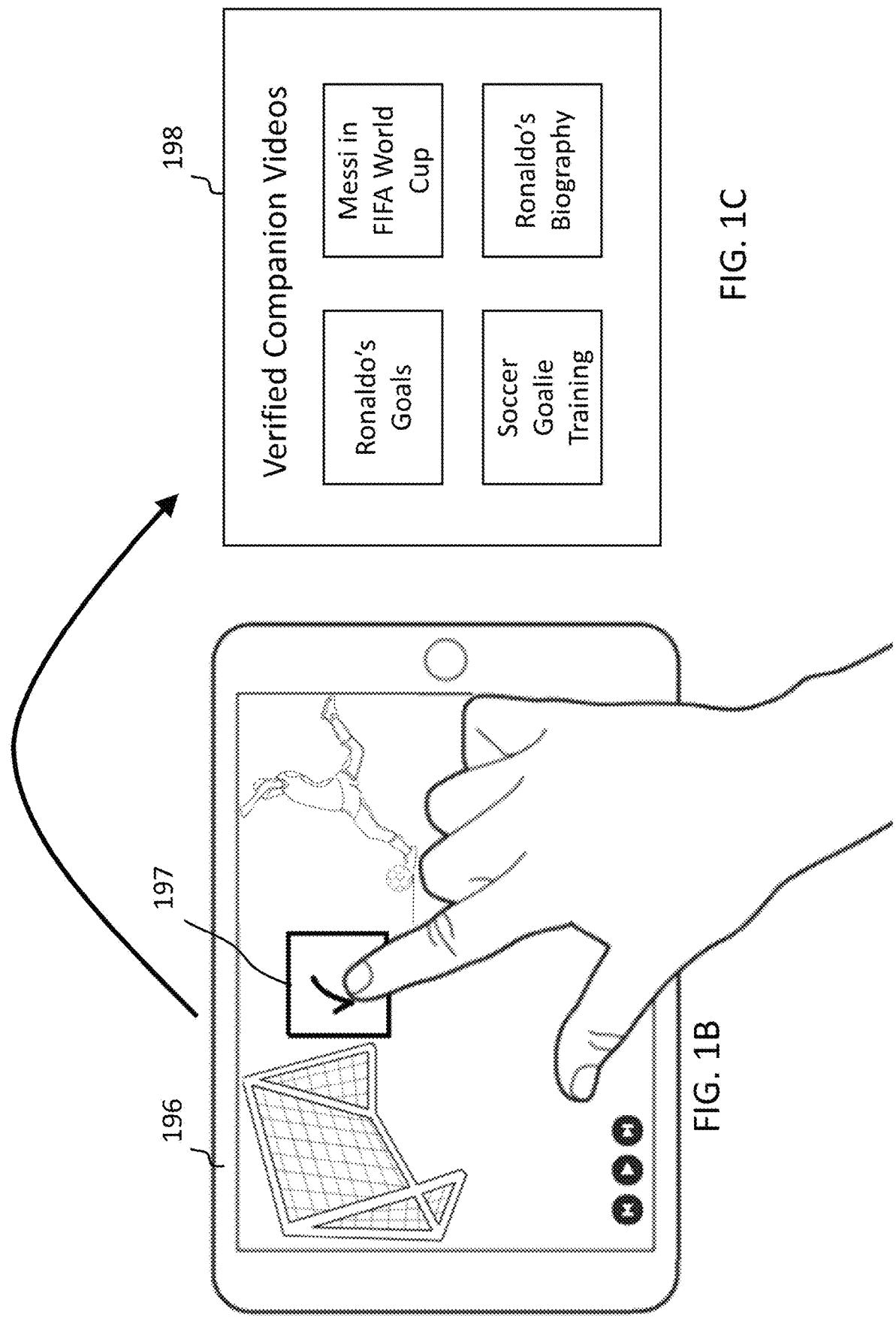

GENERATING VERIFIED CONTENT PROFILES FOR USER GENERATED CONTENT

BACKGROUND

This application is a continuation of U.S. patent application Ser. No. 18/113,784, filed Feb. 24, 2023, which is a continuation of U.S. patent application Ser. No. 17/368,122 (now U.S. Pat. No. 11,615,139), filed Jul. 6, 2021. The disclosure of which is hereby incorporated by references herein in its entireties.

Embodiments of the present disclosure relate to dynamically generating a search template based on display of a media asset and using the search template to search, identify, and score a related publicly available media asset.

SUMMARY

Various media platforms live stream media assets for consumption. These media assets include audio, video, and multimedia assets, such as talk shows, news, financial updates, movies, and episodes of a series. Media assets that relate to the live stream media assets may also be posted on public platforms by several users. It would be desirable by the platform that live streams a media asset to provide links to other companion media assets to provide additional information on the live stream topic to the users. For example, if a live stream event displayed is a tennis match between Roger Federer and Raphael Nadal playing at the Wimbledon™, then a companion/related video that is posted publicly by a user on a different platform that shows an older tennis match between Roger Federer and Raphael Nadal, a review or analysis of the current match, Roger Federer's biography, or recent news relating to either Roger Federer or Raphael Nadal would be of interest to the viewers. Also, companion media assets that relate to Roger Federer's lifestyle, his daily exercises, or his practice sessions may also be of interest to the viewers.

Although it would be desirable for the live stream platform to post a link to the related/companion videos, because of the enormous amount of content available through the Internet, currently there does not exist a system capable of automatically verifying, or verifying without user input, the related/companion media asset to determine: 1) whether the companion media assets are in fact related and relevant to the live streamed media asset, and 2) if they are related, whether the content within the companion media asset is appropriate for the consumer.

In one approach a system may collect only minimal amount of information when a media asset is uploaded by a user to a public platform (e.g., title and tags). For example, information collected when a media asset is uploaded may include a brief description of the media asset, hashtags, category, age restriction, and language, which is minimal and not adequate for creating a full and thorough profile of the media asset, thereby resulting in the media asset not being properly or thoroughly verified.

Drawbacks of not verifying the companion media asset's relatedness and appropriateness to the live stream or primary media asset results in the companion media asset not being suggested for the primary media asset, thereby resulting in the companion media asset not being discovered through the platform. To the contrary, if the companion media asset is suggested by the platform without proper verification, it may result in a companion media asset that is not related to the live streamed primary media asset or may contain nudity, foul language, or other inappropriate content that would result in the live stream platform losing its credibility for curated content.

In accordance with some embodiments disclosed herein, to solve the above-mentioned limitations of such approaches, systems and methods are provided to overcome the drawbacks by dynamically generating a search template based on the primary media asset, using the generated template to search, identify, and score publicly available companion media assets that match context terms of the primary media asset, and providing access or link to the publicly available content if the trust score of the publicly available companion media assets are within a rating range of a trust score.

The method, which may be performed by a control circuitry, may include displaying a media asset, also referred to as primary asset, live streamed media asset, or main media asset, on a display device. It also may also include placing a media asset in a playlist. In some embodiments, the system, through the control circuitry 1004, receives a request for additional content, also referred to as companion media assets or user-uploaded media asset, that is related to the primary media asset. The request may be made by a user or system at any given play position in the media asset, prior to display of the media asset when watching a media asset that is available on-demand, or at the end of display of the media asset.

The additional content, or companion media asset, relates specifically to a segment, or play position in the primary media asset, at which the request for additional content was made. This provides a benefit of the additional content being contextually related to the primary content displayed to the viewer. For example, if a primary media asset includes content segment 1 at play position 1, content 2 at play position 2, and content 3, at play position 3, and a request for additional content is made at play position 2, then additional content that contextually relates to primary content displayed at play position 2, or a predetermined time before play position 2, is searched for, curated, and a link to the additional content is displayed for selection.

The process of searching, identifying, and providing a link to the additional content may be performed by the control circuitry 1004 and may include determining a play position in the primary media asset at which a request for additional content is made. In some embodiments, metadata relating to a predetermined amount of time prior to the current play position is downloaded to a running buffer by the control circuitry 1004 of FIG. 10. In some approaches, the system, through control circuitry 1004, is configured to track the progress of the play position in the primary media asset such that metadata from the most recent content from the current play position and a play position that is a predetermined amount of time prior to the current play position is downloaded.

A dynamic search template may be generated by the control circuitry 1004 from the most recent metadata downloaded from the primary media asset. Exemplary dynamic search templates are depicted in FIGS. 7B and 7C. The dynamic search template may include a plurality of parameters that serve as the search parameters for finding additional content. The system, through its control circuitry 1004, may generate a batch application programing interface (API) request based on the search parameters from the search template. The batch application may be used to retrieve multiple companion videos from multiple platforms at the same time.

Each API request, from the API batch request, may be directed by the control circuitry 1004 to a specific database/platform where companion content can be searched. For example, an API batch request may be specifically directed to YouTube™.

In response to the API request, the platform may return a plurality of related companion media assets. In some embodiments each companion media asset is analyzed by the control circuitry 1004 using audio, video, and/or textual analysis methods. Although reference are made to control circuitry performing the analysis, other method, such as cloud services that are capable of performing metadata analysis in real-time to extract metadata are also contemplated. As part of the analysis, additional metadata related to the companion media asset may be generated. This additional metadata may be used to obtain companion video asset(s) that were uploaded by a user to an online platform. It may also be used to obtain companion videos such as trailers of a movie and other related companion media assets. Since the original companion media asset may have limited metadata that does not fully capture the context of the companion media asset, especially when the context may change multiple times during the display of the companion media asset, the additional metadata gathered through the analysis provides a deeper insight into the companion media asset, including various segments and changes of context within the companion media asset. The additional metadata obtained through this analysis may be added to the companion media asset and a verified profile that contains the additional metadata and the original metadata may be stored in a database.

In some embodiments, the control circuitry 1004 may access a trust score for the companion media asset. Since the metadata for the companion media asset may be limited, the trust score may also be limited as it is also based on the limited metadata. As such, the server may modify the trust score by performing additional contextual analysis. The additional contextual analysis comprises evaluating the trust score in light of the context for which the companion media asset is being searched for. For example, if a search parameter used in the dynamic search template is tennis, then the companion media asset is contextually analyzed to determine if the trust score is reflective of the context, which is tennis. If the trust score is not based on the context, which is tennis, then the trust score is modified by the control circuitry 1004 in light of the tennis context. As such, different search terms resulting in the same companion media asset may have different trust scores because the companion media asset may be relevant for one search term and not for another. An example of different trust scores is described further in FIG. 7A where one search term "Gastrectomy" and another search term "Adult Film" both result in the same companion media asset 700, however, the trust score which is an aggregated scores of a plurality of factors, with nudity being one of the factors, will differ based on the search term and the context thereby resulting in, for example, a higher trust score for Gastrectomy and a lower trust score for Adult film.

Trust scores may also be modified by the control circuitry 1004 based on a plurality of factors. These factors include topic, rating, relevance, contacts, channel, an advertisement. In some embodiments, if the companion media asset was posted on a reputable channel, associated with a brand advertisement that is known to be reputable, or the companion media asset is rated by a reputable rating service, then since it is more than likely that such reputable rating services, channels, brands are typically associated with high quality and curated content, it is likely that the current companion media asset is also of high quality, curated, and trustworthy, and thereby should also receive a high trust score.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 1B depicts a selection made on a user interface of an electronic device, in accordance with some embodiments of the disclosure;

FIG. 1C depicts a list of verified videos that relate to the selection made on the user interface, in accordance with some embodiments of the disclosure;

DETAILED DESCRIPTION

Figure 1A:
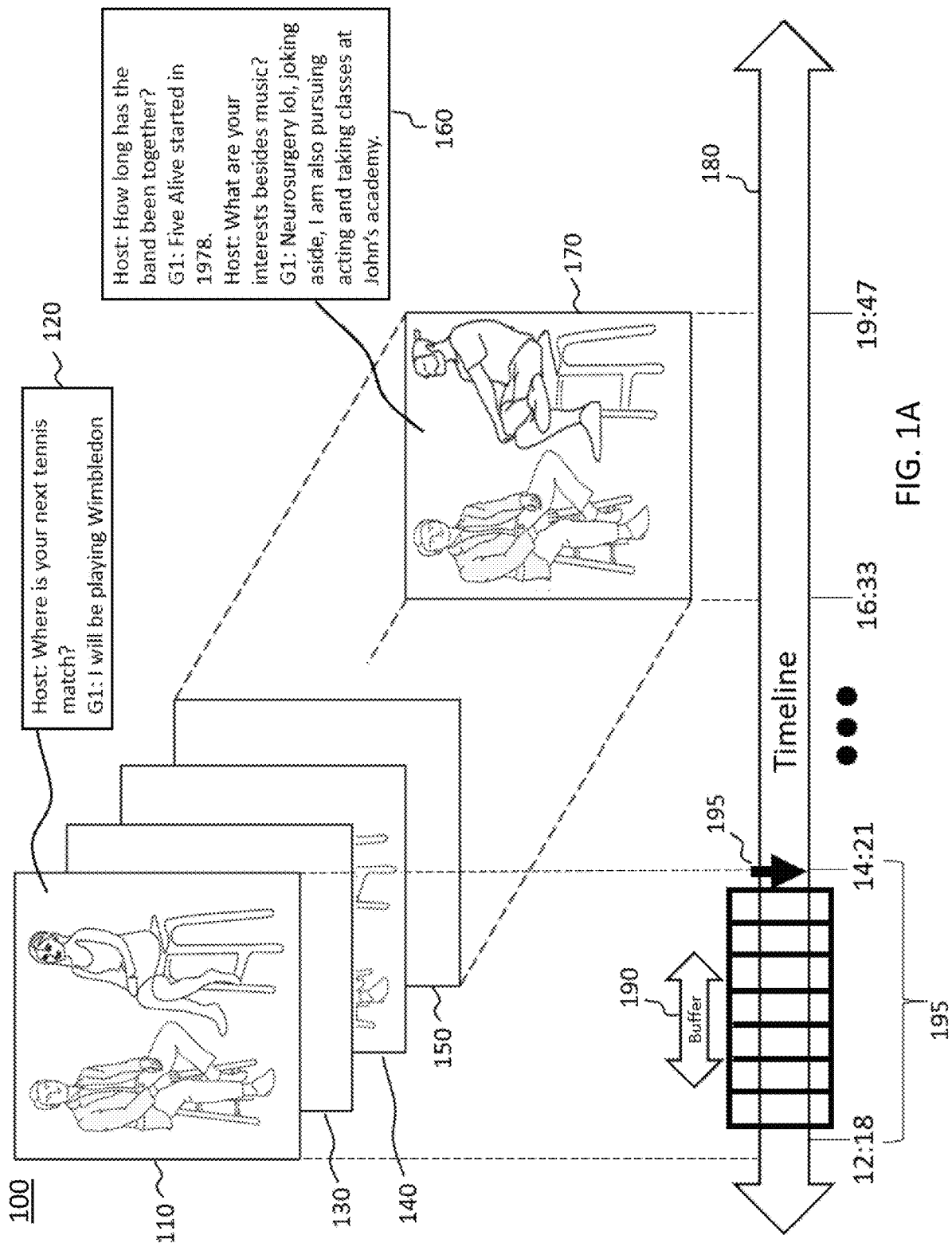
FIG. 1A depicts some exemplary process for providing companion asset recommendations, in accordance with some embodiments of the disclosure.

FIG. 1A depicts some exemplary segments, or time slots, of a primary media asset and a running buffer used for buffering segments, or time slots, of the primary media asset, in accordance with some embodiments of the disclosure. The media asset 100, also referred to as primary media asset, current video, main video, current media asset, live streamed media asset, and main content, is displayed on a media device. The media asset may be a movie, sit-com, a live game, episodes of a series, a talk show, a documentary, news, financial updates, or any type of audio or video asset.

The media asset may be user generated or may be a trailer of a movie or another media asset that is contextually related to the primary media asset.

The media asset may be divided into a plurality of time slots or segments. For example, it may be divided into time slots of a predetermined amount of time, such as 5 minutes. A portion of the time slots or segments 110-170 of the media asset are depicted in FIG. 1A. A segment or time slot may include a plurality of video frames and associated audio that spans a certain duration of time on the primary media asset timeline 180. For example, media segment 110 has a start time of 12:18 and an end time of 14:21 and media segment 170 has a start time of 16:33 and an end time of 19:47.

Figure 10:
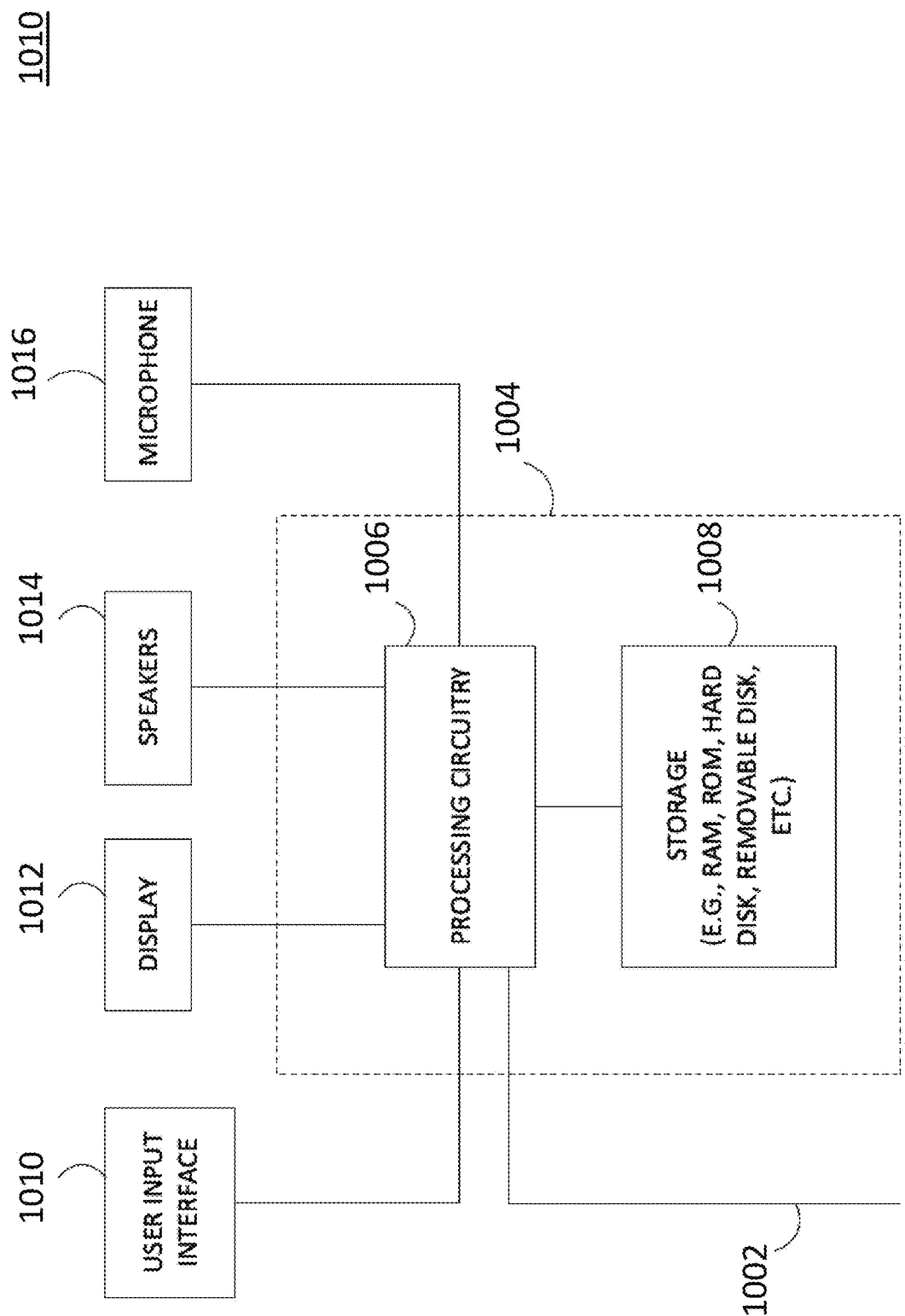
FIG. 10 is a block diagram of a generalized media device, in accordance with some embodiments of the disclosure.

A running buffer 190 is used to buffer metadata relating to the most recent segment or time slot of the primary media asset. The metadata may be obtained from a database associated with storing the media asset or the metadata may be dynamically generated based on real-time audio, video, and textual analysis performed on the primary media asset. In some embodiments, the current play position of the primary media asset is tracked by the system, such as through the control circuitry 1004 as depicted in FIG. 10. As the play position of the primary media asset moves forward in time, i.e., the primary media asset continues to be played, the control circuitry 1004 downloads metadata for a predetermined period of time before the current play position to the running buffer. For example, if the current play position is at 14:21, as depicted by arrow 195, then the control circuitry 1004 would cause the download of the most recently played segment from 12:18 to the current play position 14:21 to the running buffer. Since the media asset may already be downloaded for display, the running buffer would be used specifically for downloading a specific segment/portion of the media asset that has recently been played, which is a subset of the already downloaded media asset. The predetermined time may be set by the user or the system and may be modified as needed. The predetermined time may be any desired time frame, such as 1 second, 10 seconds, 2 minutes, or the entire segment 110.

The system, using control circuitry 1004, tracks the progress of the primary media asset, such as from segment 110 all the way to segment 170. In some embodiments, the system may automatically and continuously cause download of the metadata to the running buffer, e.g., and store it in the memory 1008 of FIG. 10. The download may be for a predetermined interval of time prior to the current play position. To manage buffering space, the system may discard previously buffered metadata. Doing so may create space in the buffer to accommodate for the continuous buffering of new metadata that is associated with the most recent play position. In some embodiments, the buffering of metadata associated with the predetermined interval prior to the current play position may be performed only in response to a request for related media assets. As described herein, related media assets, also referred to as companion media assets, companion videos, additional media assets, supplemental media asset, or secondary media assets, are media assets uploaded by another user on an online platform that can be publicly accessed and are related to the primary/main media asset. The online platform may allow a plurality of users to access the uploaded content via a public network from a server of the online platform. The related media asset may also be posted on a private platform that can be accessed by its members. The media asset may be user generated or may be a trailer of a movie or another media asset that is contextually related to the primary media asset.

In some embodiments, FIG. 1A depicts a primary media asset that is a talk show. Some of the segments shown in this embodiment include a host sitting on the left side of the frame speaking to their guest sitting to the right side of the frame. For example, in segment 110 the host is speaking to a tennis player and asking the question "where is your next tennis match?," as depicted in block 120. To which the guest is depicted as responding, "I will be playing Wimbledon." In this embodiment, if the current play position is at 14:21, then the system, through control circuitry, would capture the dialogue between the host and the tennis player for a predetermined interval prior to time 14:21.

In some embodiments, the viewer watching segment 110, may make a request for companion videos related to the current/primary media asset being watched. An exemplary request is shown in FIG. 1B where a checkmark is selected to request for the companion videos. In response to the request, a dynamic search template can be generated by the control circuitry 1004 while the viewer is still watching the media segment. The dynamic search template is generated based on the metadata of the most recent segment that was downloaded by the control circuitry. For example, if a user request for related videos at 14:21, and assuming for explanatory purposes that the predetermined time interval set for the running buffer is the entire duration of the segment, then the system, through control circuitry 1004, would download metadata from 12:18 to 14:21, which may include the conversation between the talk show host and the tennis player as describe in block 120. Although the example describes downloading the whole segment from 12:18 to 14:21, the predetermined interval may be set to a shorter time, such as for 2 minutes.

Natural language processing algorithms, and other processing tools, such as artificial intelligence (AI) algorithms, may be used by the control circuitry 1004 to analyze the metadata of segment 110 downloaded by the system, through control circuitry, to select search keywords, parameters, and context for the dynamic search template. For example, from the uttered conversation in block 120, some exemplary keywords generated may be "Tennis Match," "Wimbledon," and the name of the tennis player that is being interviewed. The AI algorithm may analyze the conversation and determine that the context of the conversation in block 120 relates to a Tennis Match. If the uttered conversation between the host and the tennis player also included a discussion about the tennis player's previous opponents or a recently played match, then keywords and context would also reflect those conversations. As such, the keywords and context extracted for dynamic search template are directly and specifically related to the most recent segment of the media asset and not generally to the metadata of the overall media asset. Although the overall metadata, such as metadata added during the upload of the media asset that generally describes the media asset, may still be used, the dynamic search template focuses on the most recent metadata within the predetermined time period as a focus of the search. Focusing on the most recent segment allows search and presentation of related videos also to relate to the most recent conversation.

In some embodiments, the dynamic search template is generated by the control circuitry 1004 based on the most recent metadata from the running buffer with the following compilation: 1) Topic+rating+relevance+context and in another embodiment, 2) Topic+relevance+context. Exemplary dynamic search template with the above mentioned compilations are depicted in FIGS. 7B and 7C.

As depicted in FIG. 1A, in some embodiments, as the talk show progresses from one segment to another, the guest that are being interviewed also change. In segment 110, the guest is a tennis player and as the show progresses in segment 170 the guest is a singer from a band named "Five Alive." In some embodiments, the viewer watching the media asset makes a request for companion videos related to the current media asset when segment 170 is being displayed. In response to the request, the dynamic search template is generated by the control circuitry 1004 while the viewer is still watching segment 170. Accordingly, the dynamic search template is based on the metadata of from segment 170, i.e., from the play position where the request was made to a prior play position that is within the predetermined time interval. Assuming for explanatory purposes that the predetermined time interval set for the running buffer is the entire duration of segment 170, then the system, through use of the control circuitry 1004, would download metadata from 16:33 to 19:47 to the running buffer, which includes the conversation between the talk show host and the singer from the band "Five Alive" as described in block 160. Although a time interval of the entire segment is used in this example, as mentioned previously, the predetermined time interval can be as desired by the user or the system, for example it could be one second, ten seconds, one minute etc.

Natural language processing algorithms, and other processing tools, such as artificial intelligence (AI) algorithms, may be used by the control circuitry 1004 to analyze the metadata of segment 170 downloaded by the system, through control circuitry, to the running buffer, to select search keywords, parameters, and context for the dynamic search template. For example, from the uttered conversation in block 160, some exemplary keywords generated may be "Five Alive," "1978," "Neurosurgery," "John's academy," and the name of the singer that is being interviewed. The AI algorithm may analyze the conversation and determine that the context of the conversation in block 160 relates to the singer's career, formation of the band, and the singer's interest/hobbies outside of music. Although the word "neurosurgery" is uttered in the conversation, the AI algorithm would determine that neurosurgery is not related to the context of this conversation. The AI algorithm may analyze the conversation and keywords from the conversation in context with the rest of the conversation to determine if it is a primary or secondary topic of the conversation or is not related to the conversation. Since a singer of a band discussing bands history and his other hobbies mentioned neurosurgery as a joke, the AI algorithm would determine that neurosurgery is not the context of the conversation and, as such, not use neurosurgery as a search term for searching companion videos.

As depicted in FIG. 1A, in some embodiments, the content of the primary media asset switches from segment to segment, such as from a conversation with a tennis player in segment 110 to a conversation with a singer of a band in segment 170. In another embodiment, the content of the primary media asset may switch even within a segment, sometimes several times within a segment, and may even switch from minute to minute. Having the system download, to the running buffer 190, the most recent metadata of the primary media asset, and then generating the dynamic search template, which is based on the most recent metadata, allows the search conducted using the dynamic search template also to be relevant to the most recent metadata that was recently viewed. For example, videos related to tennis star can be searched, analyzed, curated, and displayed to the user if the user requests related videos while watching the segment of the tennis player.

The dynamic search template is used for searching one or more companion media assets that may be posted either for public consumption, or private consumption, by another user on a public or private platform. If it is posted on a private platform, then access may be provided to subscribers of the platform and in order for the user to obtain companion videos from the private platform, the user may need to be a subscriber to the private platform.

The keywords and parameters of the dynamic search template, which were derived from the most recent metadata downloaded by the system, by using the control circuitry, to the running buffer, are used to perform a search for companion media assets. The media assets discovered based on the search are then analyzed and curated.

Figure 8:
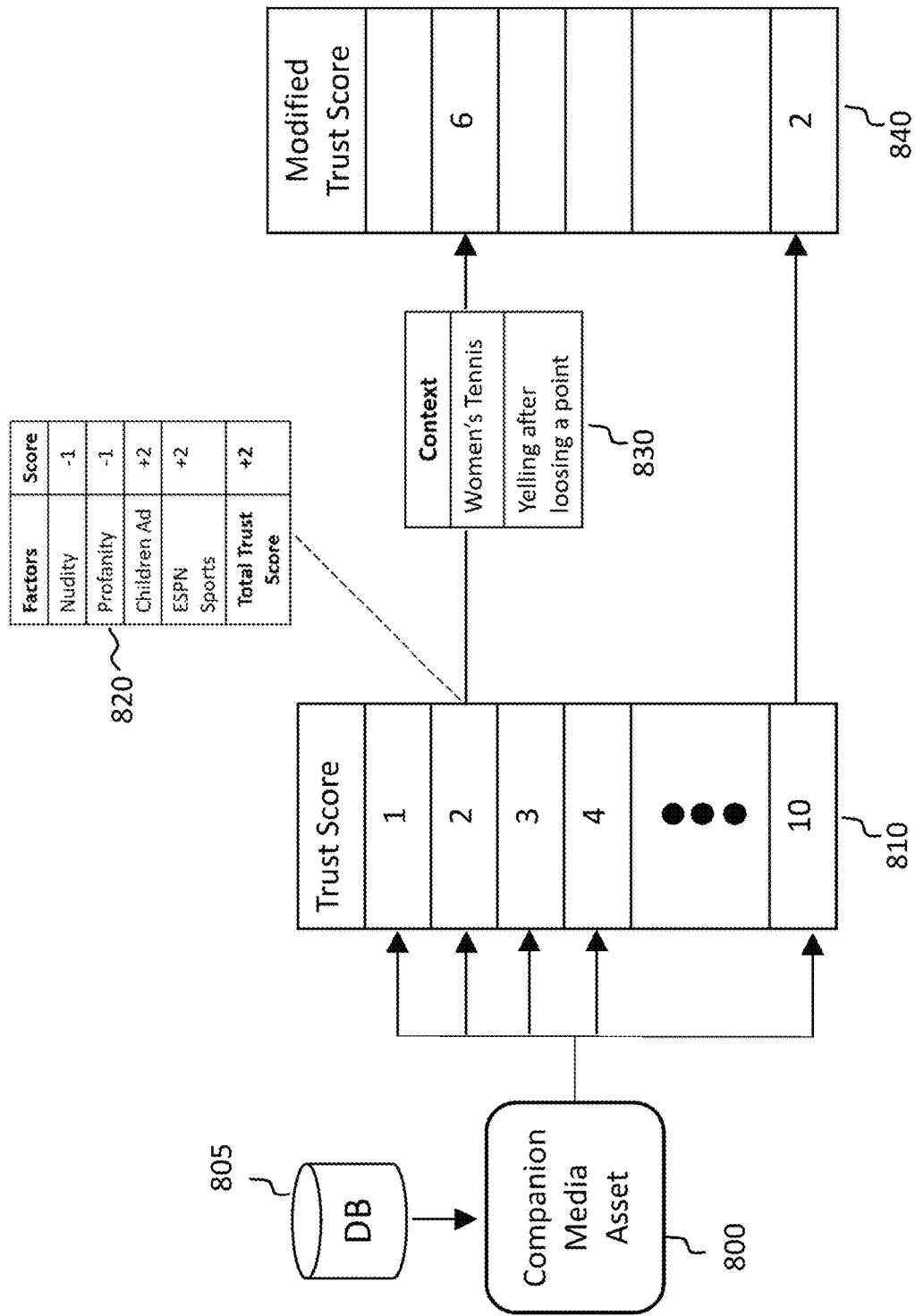
FIG. 8 is an exemplary block diagram for modifying an original trust score based on context, in accordance with some embodiments of the disclosure.

In some embodiments, each companion media asset is analyzed in connection with the topic and context of the primary media asset, or the segment of the primary media asset, which formed the basis of the dynamic search template. In some embodiments, as depicted in FIG. 8, the companion media asset is scored. A score from 1-10, or some other score based on a different scale, may be assigned to the companion media asset based on a plurality of factors. These factors include, for example, topic, rating, relevance, context, channel, brands and advertisements, as described in further detail in FIG. 6.

In some embodiments, the system may provide an explanation of the factors used to derive the trust score. For example, each factor may be given a predetermined score, such as profanity may have a score of +/−1 depending on the context, the companion media asset posted on a particular channel may be given a +/−1 score based on the channel, where a well-known channel that is known to have curated content may be given a higher score of +/−2. A channel may be regarded as well know if it has a certain number of viewership. An aggregated trust score may be assigned by computing all the scores for each factor.

The trust score for each factor, or the aggregated trust score for all the factors, may be dynamically modified based on the change in context. In some embodiment, the trust score may be modified in real time. For example, if a companion media asset received a negative trust score due to some nudity in the media asset, however, after further analysis it was determined that the context of the companion media asset was surgery where an operation is performed and some exposure and nudity was a byproduct of the surgery and not for sexual gratification, then a lower trust score given due to nudity may be dynamically, or in real-time, be elevated to a higher trust score since nudity is not a focus and any nudity shown is not shown in an inappropriate manner. An example of a different score for nudity when it is relevant to the context and a score for nudity when it is not relevant to the context is described in the description of FIG. 7A.

FIG. 1B depicts a selection/request made on a user interface of an electronic device, in accordance with some embodiments of the disclosure. As described in FIG. 1A, a request can be made for additional content while the primary media asset, such as a media asset offered for consumption by Netflix™, is displayed on a media device 196. The request may be received by the system and processed to search and find companion videos 198 from a platform or a verified database. As depicted in FIG. 1B, a soccer match is being displayed. For explanatory purposes, the primary media asset may be a FIFA™ world cup soccer match between Argentina and Portugal. In this example, among other players, player Lionel Messi is on the field and playing for Argentina and player Cristiano Ronaldo is playing currently depicted as the player kicking a penalty goal for Portugal. In this embodiment, if the user (or system) makes a request for additional content by selecting an additional content selection 197, since at the time of selection, the current play position in the primary media asset is Ronaldo kicking the penalty goal, a plurality of verified videos in FIG. 1C that contextually relate to the context of the current play position in FIG. 1B may be accessed from verified database 198. For example, since the current play position includes Ronaldo, a goalie defending Ronaldo's kick, and Messi somewhere on the field, the system may allow for selection any one of the companion media assets 198 that contextually relate to the displayed content, e.g., Ronaldo's Goals, Messi in FIFA World Cup Soccer Goalie Training, or Ronaldo's biography, for selection.

In some embodiments, the companion videos depicted in FIG. 1C may be obtained by signaling a server and requesting a link or download to the companion videos. In this embodiment, the server may track play position and consumption of the media asset in real time, i.e., the server would be aware at the current play position that is being displayed, such segment 110 or segment 170 in FIG. 1A. The server may receive a request from the user device to provide the additional content/companion video and since the server is already aware of the current play position, the server may fetch the videos as depicted in FIG. 1C and provide links for download to the user device.

Figure 2:
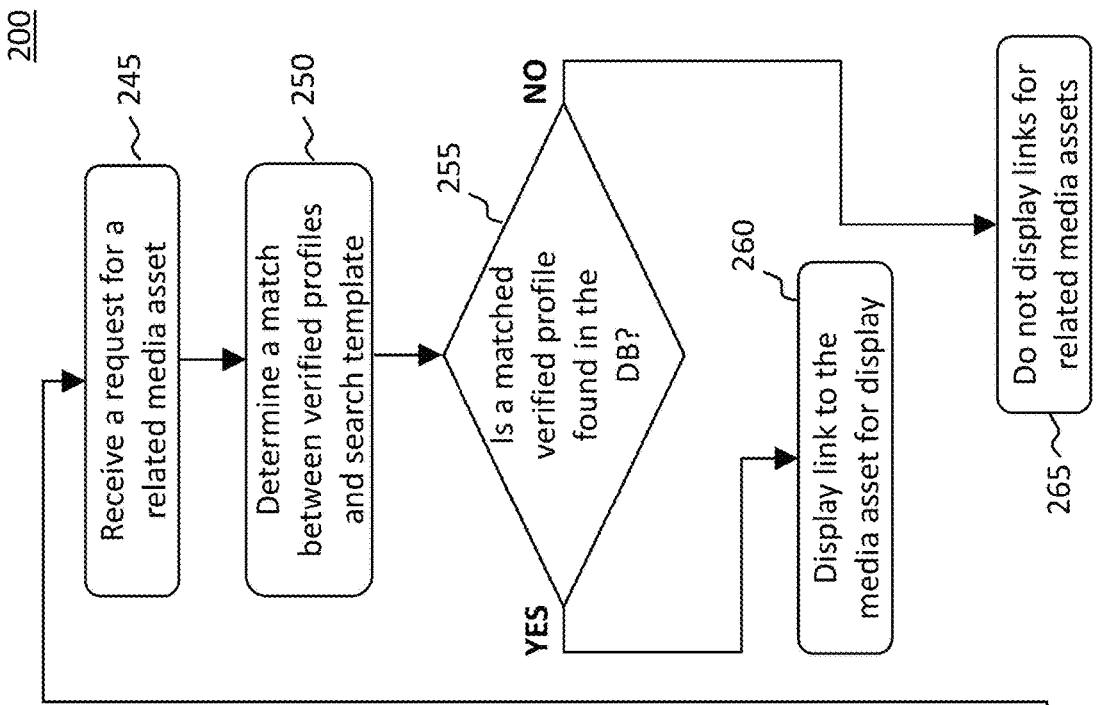
FIG. 2 is flowchart of a process for providing companion asset recommendations, in accordance with some embodiments of the disclosure.

FIG. 2 is flowchart of a process 200 for dynamically generating a search template based on display of a media asset and using the search template to search, identify, and score a publicly available user-generated companion media asset.

Figure 9:
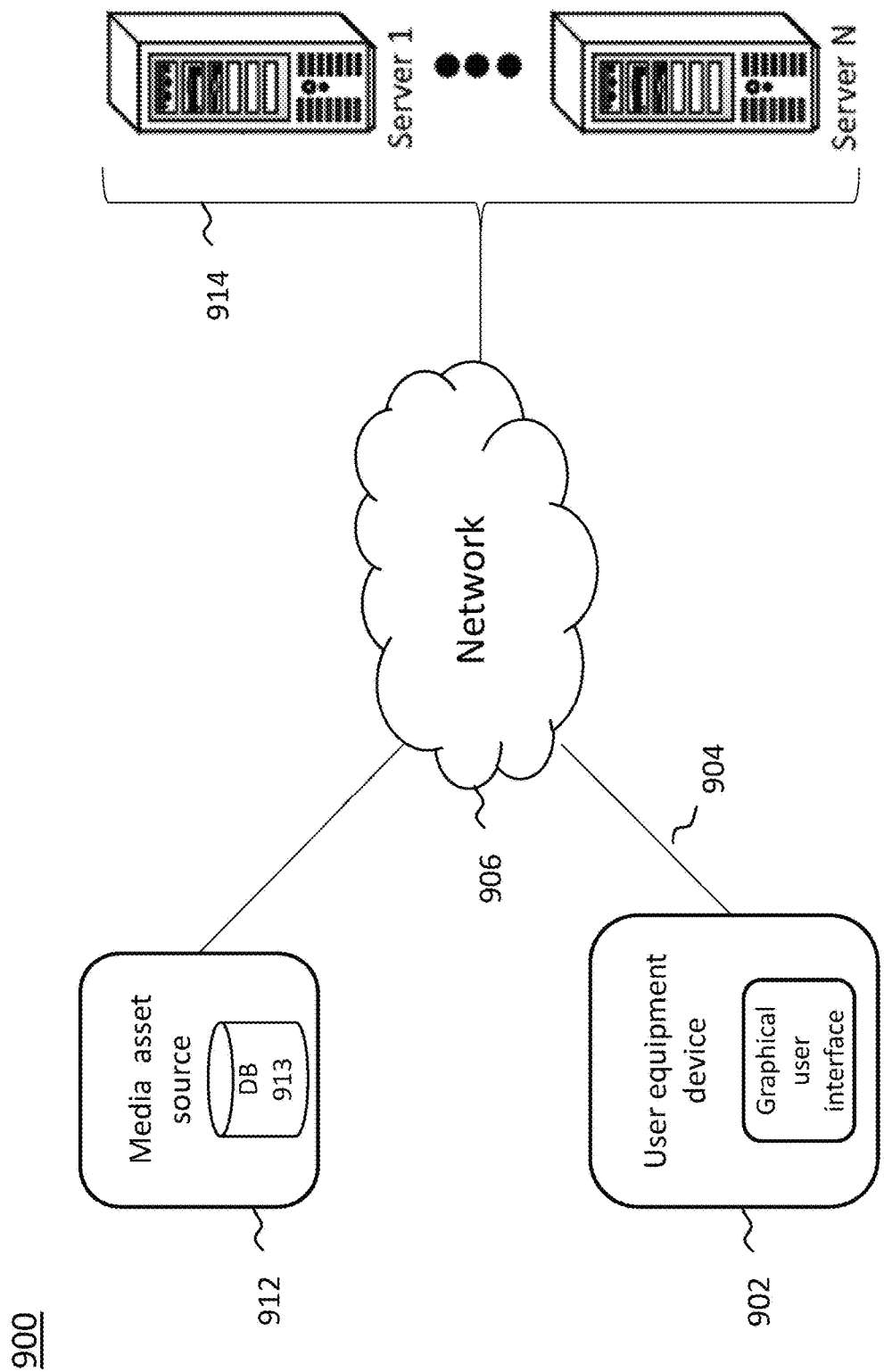
FIG. 9 is a block diagram of an exemplary system for dynamically generating a search template and searching, identifying, and scoring companion media assets, in accordance with some embodiments of the disclosure.

In some embodiments, the individual steps of process 200 may be implemented by one or more components of the devices and systems of FIGS. 9-10. Although the present disclosure may describe certain steps of process 200 (and of other processes described herein) as being implemented by certain components of the devices and systems of FIGS. 9-10, this is for purposes of illustration only, and it should be understood that other components of the devices and systems of FIGS. 9-10 may implement those steps instead. For example, the steps of process 200 may be executed at device 196 of FIG. 1B.

At 205, control circuitry 1004 (e.g., of device 196, device 902, and/or server 914) may access a database (e.g., database 913 of FIG. 9) storing a plurality of database records (e.g., corresponding to segments 110-170 depicted in FIG. 1A or GUI depicted in device 196 of FIG. 1B), that may be stored in a storage, such as storage 1008 of FIG. 10. Each database record comprises or is otherwise associated with an indication of whether access should be granted to the system or platform.

At block 205, the control circuitry may display the primary media asset on the user's media device, such as a user device of FIG. 1B, or on a GUI of the user device. The media asset maybe a movie, sitcom, episode of a series, or some other form of media asset that was selected by the user for consumption. In some embodiments, the media asset may have been accessed by the user device, through a network, such as the Internet or the network described in FIG. 9, from a platform such as Netflix™, Amazon™ prime, local television channels, or cable television.

At block 210, metadata relating to the current portion of the media asset is downloaded by the system, by using the control circuitry 1004, to the running buffer, such as the running buffer depicted in FIG. 1A. In some embodiments, the system, through use of the control circuitry, may automatically download metadata to the running buffer on a periodic basis. In another embodiment, the control circuitry 1004 of the system may download, to the running buffer, metadata of the current portion of the primary media asset in response to a request by a user for additional content. The current portion of metadata includes, metadata from the current play position and a predetermined time period that is prior to the current play position, wherein the predetermined time frame is set either by the user or by the system.

In some embodiments, the system, such as through use of the control circuitry 1004, tracks the play position of the primary media asset. For example, if the current play position of movie is at 5 minutes and 32 seconds, then the running buffer would also be at the same play position. As the movie continues to play and the play position advances, the system, through use of control circuitry, also tracks and moves along with the current play position.

In some embodiments where the metadata is downloaded by the control circuitry 1004 in response to a request for additional content, in operation, the system, through the use of the control circuitry 1004, determines the current play position of the media asset. The system, through the control circuitry 1004, then calculates a period of time prior to the current play position. As mentioned earlier the period of time is predetermined and set either by the system or the user. The system then obtains metadata from the prior predetermined period of time to the current play position. For example, if the predetermined time is set to be 2 minutes, and the current plate position is 16:15, where the number 16 represents minutes and 15 represents seconds, then the system, through use of the control circuitry, may download metadata from a play position of 14:15, which is 2 minutes prior to the current play position, to 16:15. As such, the downloaded metadata relates to the most current topic being played in the media asset.

At block 210, the control circuitry 1004, dynamically generates a search template. An exemplary dynamic search template is depicted in FIGS. 7B and 7C. The search template may include a plurality of parameters that are determined based on the downloaded metadata. Since the metadata is from the most recently played segment of the primary media asset, the search parameters in the dynamically generated search template also reflect the most recent topic and context of the most recently played segment of the primary media asset. For example, if a media asset that is 3-minute-long sports news were the topic of discussion and the first minute discusses basketball, the second minute discusses swimming, and the third and last minute discusses baseball, then the search parameters in the dynamically generated search template also change by the minute.

As such, if a request for additional content is made in the first minute, then the parameters in the dynamically generated search template relate to basketball. For example, search parameters may include: Basketball, Stephen Curry, NBA playoffs, depending on the context of the discussion in the first minute. Algorithms such as natural language processing (NLP) algorithm an artificial intelligence (AI) algorithm may be used to analyze the spoken conversation in the first minute and convert them into searchable parameters or vectors.

Likewise, if a request for additional content is made in the third minute, then the parameters in the dynamically generated search template, which may be generated by the control circuitry 1004, relate to baseball. Tracking the current play position, buffering metadata based on the current play position, and generating parameters to reflect the current play position of the primary media asset, which may be performed by the control circuitry 1004, ensures that the search conducted using the dynamic search template is focused on obtaining companion video assets that are directly related to the most currently discussed topic in the primary media asset.

Figure 3:
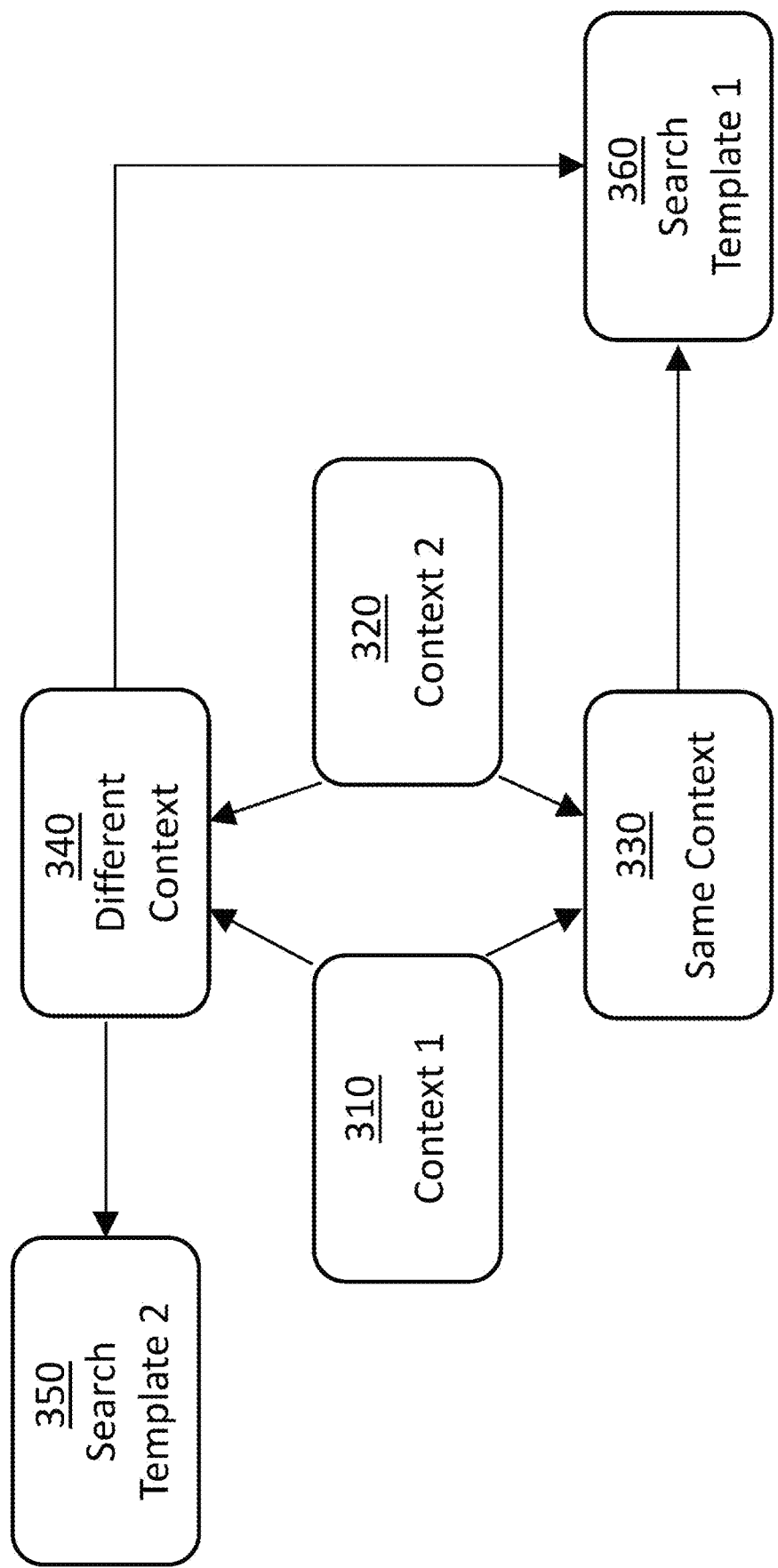
FIG. 3 is a block diagram of a plurality of dynamic search templates generated based on plurality of contexts, in accordance with some embodiments.

The dynamic nature of the search template, such as the dynamic search templates depicted in FIGS. 7B and 7C, is further described in the discussion of FIG. 3. As depicted in FIG. 3, the same media asset may have two different contexts based on its play position. Block 310 depicts a first context and block 320 depicts a second context of the same primary media asset. As the primary media asset is played, and the discussion in the primary media asset advances from one context to the next context, the system, through use of the control circuitry 1004, tracks the change in contexts and downloads metadata for the most recent context. A dynamic search template is the generated by the control circuitry 1004 based on the metadata of the most current context. In some embodiments, multiple requests for companion assets may be made within a span of time while the same primary media asset is being played. In such embodiments, if the requests are within a predetermined threshold of time, then the control circuitry 1004 determines whether there is a change in context or if the context has stayed the same between the requests. For example, in some media assets, a same topic may be discussed in detail over a longer period of time. As such, multiple requests for companion content within a short span of time may reveal that the context has not changed. As depicted in block 330, if the context of the multiple requests is determined by the control circuitry 1004 to be the same context, then the same search template is used by the control circuitry 1004 to search for companion videos. However as depicted in block 340, if the context of the first request and the context of the second request are different, then two separate search templates, as depicted in blocks 350 and 360, having different search parameters that reflect their respective context may be generated by the control circuitry 1004.

Figure 4:
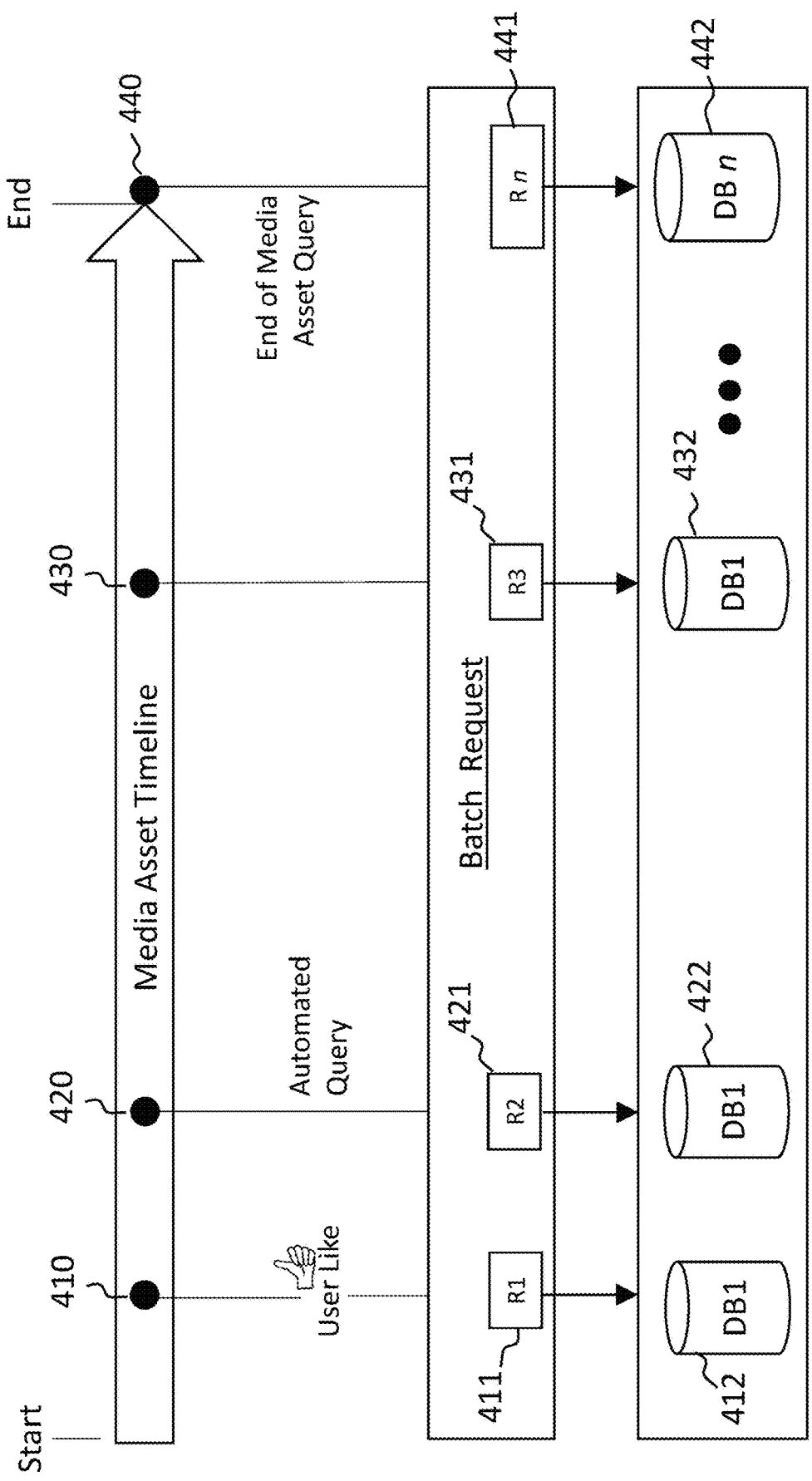
FIG. 4 is a block diagram of an application programing interface (API) batch request based on the search parameters from the dynamic search template, in accordance with some embodiments.

Referring back to FIG. 2, at block 220, the control circuitry 1004 generates a batch application programing interface (API) request based on the search parameters from the dynamic search template. An exemplary API batch request is depicted in FIG. 4.

The batch request may consist of a plurality of requests that are specific to a platform or a database. For example, API request R1 (411), may be directed at database one (DB1) or platform one 412, API request R2 (421), may be directed at database two (DB2) or platform two 422, and API request Rn (441), may be directed at database n (DBn) or platform n. Instructions stored in a database may be accessed by a processor or control circuitry and when the instructions are executed may cause the batch request to be sent to a plurality of platforms and databases. In some embodiments, the batch requests may include the dynamic search templates, such as the dynamic search templates depicted in FIGS. 7B and 7C.

The API batch request may be made at any point in the timeline of the media asset, for example at play position 410, 420, 430 or at the end of the media asset at 440. The origination of the API request may be based on a user request for additional content, such as at play position 410, or an automatic system request anytime during the display of the primary media asset, such as at play position 420. In some embodiments, the system may be configured to automatically generate an API request for additional content at the end of the media asset, such as at play position 440.

In one example, at play position 410 in the primary media asset, the viewer may make a request for additional content. There may be several options for making such a request, for example, the user may select a "like" option or a thumbs up option during the display of the primary media asset and the system may associate the selection with a request for additional content that is related to the current play position in the primary media asset. Thereafter, as explained earlier, a dynamic search template may be generated, such as the exemplary dynamic search template depicted in FIGS. 7B and 7C, based on metadata collected in the running buffer. The system may then generate an API batch request which includes search parameters from the dynamic search template that are based on metadata collected at play position 410.

Referring back to block 230, in response to the API search request made to a database or platform, the platform to which the request has been made may respond by presenting a plurality of companion media assets that are related to the search parameters used in the API request. The system, through the control circuitry 1004, may then access a profile of each companion media asset found in response to the search conducted on the platform.

Figure 6:
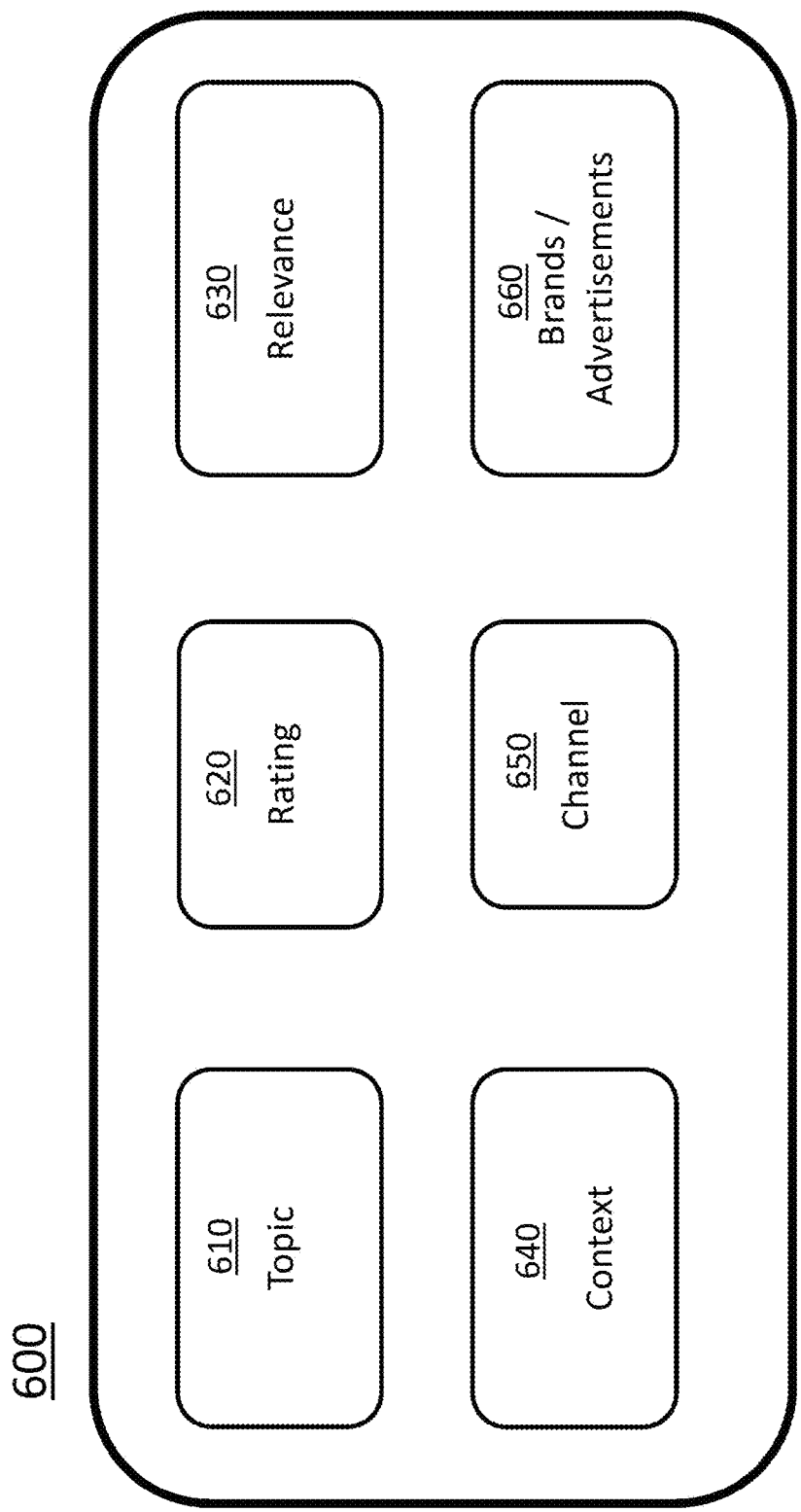
FIG. 6 is a block diagram of a plurality of factors analyzed in verifying the companion media asset, in accordance with some embodiments.

The system may then analyze the profile of the companion media asset found through the search and generate a verified profile for the companion media asset. In some embodiments, the system may perform audio analysis to generate the verified profile of the companion media asset. The audio analysis may include analyzing the speech portion of the companion media asset by using natural language processing (NLP) and artificial intelligence (AI) algorithms to process the speech and determine the topic 610, rating 620, relevance 630, context 640, channel 650, advertisements 660, and other parameters, as depicted in FIG. 6, of the conversation. In another embodiment, image or video analysis may be performed to generate the verified profile. The control circuitry 1004 may perform an image or video analysis to process the images and scenes in the companion media asset and then determine the topic, relevance, context and other parameters, as depicted in FIG. 6, related to the images. In yet another embodiment, when a closed caption file is available, NLP may be used by the control circuitry 1004 to perform a textual analysis of the closed caption file to determine the topic, relevance, context and other parameters, as depicted in FIG. 6.

Once profile has been verified, the system may store the verified profile for the companion media asset in a database, such as a verified profile database 805 as depicted in FIG. 8. A verified profile contains the additional metadata and parameters that may not be available in the original profile of the companion asset. The verified profile is associated with the companion or related media asset and used by the control circuitry 1004 to determine a match between the primary media asset and the companion media asset.

At block 255, when a request is made for a companion media asset at block 250, regardless of whether the request is made by the user or the system, the control circuitry 1004 may determine a match between the parameters of the dynamic search template and the verified profile from the database. If a determination is made at block 255 that a verified profile stored in the database, which is associated with a companion media asset, matches the parameters of the dynamic search template, then at block 260, the control circuitry 1004 may display on the media device, such as the media device 196 in FIG. 1B, a link to the companion media asset. The displayed link may appear as shown by element 197 of FIG. 1B.

The link may be generally to the media asset or specifically to a play position within the media asset that contextually relates to the play position in the displayed primary media asset where the request for companion media asset was made. As such, companion media assets that are contextually related to the primary media asset being displayed are provided to the user for access. The primary content may be made available such that even if the companion video is selected, the user can skip back to watching the primary media asset at any time as desired.

As mentioned earlier, the user may request for additional content at any time during or after the end of the media asset. When a request is made at the end of the media asset, companion videos related to the content portions that are deemed to have been the most interest to the user are retrieved and a link to the companion video is provided. A determination whether the content is most relevant may be based on user's profile or based on the user's consumption history.

In another embodiment, at the end of the media asset, the links to companion videos are automatically made available for retrieval. These companion videos relate to topics or segments that appeared during the show that are likely of interest to the user based on the user's profile or consumption history.

As depicted in FIG. 1, if the user made the request for a companion media asset during segment 110, then the control circuitry 1004 would search the verified profile database, such as database 805 shown in FIG. 8, and fetch a companion media asset that also relates contextually to the segment 110. The fetched companion media asset would relate to the original segment 110 and include some common characteristics to tennis, Wimbledon, or the guest, who is a tennis player, in the talk show.

If a determination is made at block 255 by the control circuitry 1004 that a verified profile from the database, such as database 805 in FIG. 8, does not match the parameters of the search template, then at block 265, the control circuitry 1004 does not display a link to a companion media asset. In some embodiments, when a verified profile does not exist, the control circuitry 1004 may continue to search other platforms using the same dynamic search template for companion media assets that are contextually related to the display media asset. In another embodiment, the system may edit the search parameter prior to searching again for companion media assets.

Figure 5:
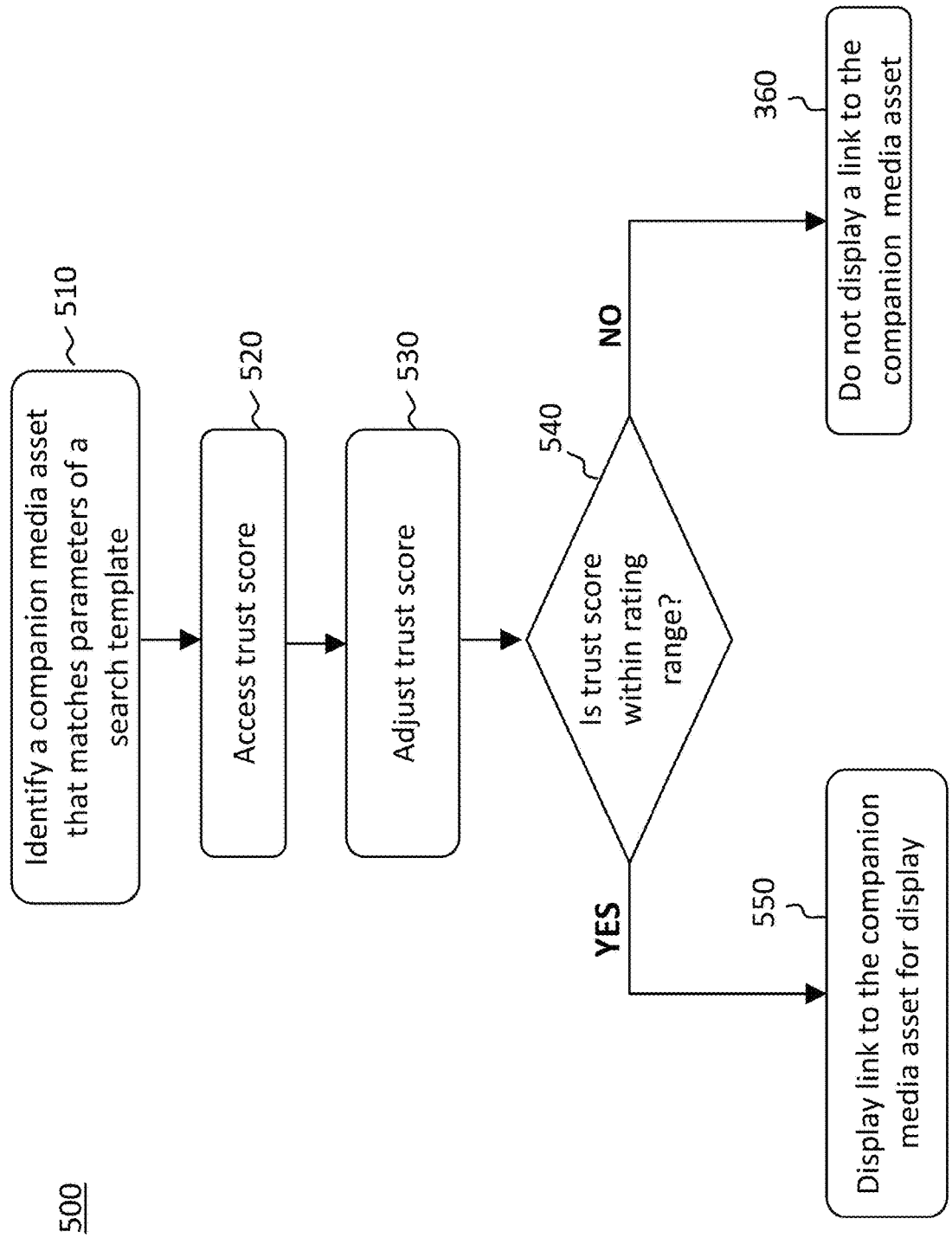
FIG. 5 is a flowchart of a process for accessing and modifying a trust score and determining if the trust score is within a rating range, in accordance with some embodiments of the disclosure.

FIG. 5 is a flowchart of a process for accessing and modifying a trust score and determining if the trust score is within a rating range, in accordance with some embodiments of the disclosure.

In some embodiments, the individual steps of process 500 may be implemented by one or more components of the devices and systems of FIGS. 9-10. Although the present disclosure may describe certain steps of process 500 (and of other processes described herein) as being implemented by certain components of the devices and systems of FIGS. 9-10, this is for purposes of illustration only, and it should be understood that other components of the devices and systems of FIGS. 9-10 may implement those steps instead. For example, the steps of process 500 may be executed at device 196 of FIG. 1B.

At block 510, control circuitry 1004 (e.g., of device 196, device 902, and/or server 914) may access a database (e.g., database 805 of FIG. 8) storing a plurality of database records (e.g., corresponding to companion videos 198 depicted in FIG. 1C). Each database record comprises or is otherwise associated with an indication of whether access should be granted to the system or platform.

At block 510, a companion media asset, to the primary media asset currently being displayed, may be identified by the control circuitry 1004. As described earlier in FIG. 2, the companion media asset may have been identified in response to a search conducted using the search parameters of the dynamic search template. Once the companion media asset is identified, a trust score is accessed at block 520. The trust score, which may be the original trust score, may be based on the original metadata of the companion media asset. Since the original metadata may be limited, the trust score may have been calculated based on the limited metadata and as such may not be fully reflective of the context of the companion media asset. For example, if a portion of the trust score is based on the companion media asset containing nudity, however the trust score was calculated with limited metadata, a much-detailed analysis of the companion media asset may reveal that the media asset relates to a surgical operation and nudity is a byproduct of showing a surgical operation scene and the nudity not included in the media device for sexual gratification.

At block 530, a detailed analysis of the companion media asset may be performed by the control circuitry 1004 to determine if the trust score needs to be adjusted. Examples of such analysis and trust score adjustments are provided in the description of FIGS. 7 and 8. In some embodiments, the trust score may be adjusted by the control circuitry 1004 based on the context of the keywords in the batch request. For example, if the trust score was based on limited metadata, and analyzing the context of the metadata reveals that the trust score should be adjusted such that it can accurately represent the context of the companion media asset, then the trust score is adjusted at block 530.

At block 540, a determination is made by the control circuitry 1004 if the trust score is within the rating range. Regardless of whether the trust score was adjusted, or the original trust score is being used, if the trust score is not within the rating range, then the system does not provide a link to the companion media asset that is associated with the trust score. The rating range is a predetermined range that may be set either by the user or by the system. An exemplary rating range maybe 60% out of 100% or 6/10 or may use some other type of scale. If a determination is made by the control circuitry 1004 at block 540 that the trust score meets the rating range, e.g., 6 or above in the mentioned example, then at block 550 the control circuitry 1004 may display a link to the companion media asset for selection. The user may then select the link to access the companion media asset. However, if a determination is made at block 540 by the control circuitry 1004 that the trust score is not within the rating range, then at block 560 the control circuitry 1004 may not display a link to the user.

FIG. 6 is a block diagram of a plurality of exemplary factors analyzed to verify the companion media asset, in accordance with some embodiments. In some embodiments, the system, through use of its control circuitry, may access the trust score of the companion media. Since the trust score may be based on limited metadata, the system may decide to verify the media asset, which includes analyzing the companion media asset and adding metadata from the results of the analysis, and then calculate the trust score based on the verified metadata.

In an embodiment where the companion media asset is verified and the verified profile is stored in a database, such as in database 805 of FIG. 8, the verification process may include the control circuitry 1004 using the exemplary factors in FIG. 6 to verify the companion media asset.

In some embodiments, "topic" 610 is an exemplary factor depicted in FIG. 6 that may be analyzed by the control circuitry 1004 to verify the companion media asset. In this embodiment, a determination is based on the topic of the companion media asset if the companion media asset can be trusted, and if so, trusted to what degree. For example, if the topic of the companion media asset is Wimbledon highlights from 2020, and the companion media asset has been found in a search for tennis, then, based on the topic, which is related to tennis, the companion media asset may be given a higher trust score and verified by the control circuitry 1004 to be contextually related to the search term, tennis. The degree or percentage of trust would depend on the total aggregated trust score for the companion media asset which may be partially based on the topic. However, in the same scenario, if the topic is Wimbledon highlights from 2020, and the companion media asset found in a search relates to horse racing, since Wimbledon is related to tennis and not horse racing, the companion media asset may be given a lower trust score by the control circuitry 1004 and verified to be contextually unrelated to horse racing. In some embodiments, techniques such as word to vector may be used to ensure that word with similar meanings have a similar representation. Using these techniques, words may be represented as vectors and each vector may be represented by a specific number. The words and phrases, such as Wimbledon, may be mapped to a vector such that they can be used to determine word predictions, word similarities, word semantics. In operation, a mathematical computation of the vector may result in a semantic similarity between the words represented by the vector and the word similarities. Other techniques may also be used to represent the keyword that is being search such that other variations, such as synonyms, are also captured in the search.

In another embodiment, "rating" 620 is an exemplary factor that may be analyzed by the control circuitry 1004 to verify the companion media asset. In this embodiment, a determination is based on the rating of the companion media asset if the companion media asset can be trusted, and if so, trusted to what degree. In this embodiment, a rating from a reputable rating service, such as Rotten Tomatoes™ for movies or ESPN™ sports for sports would carry a higher certain weight and as such receive a higher trust score than a rating from an unknown source. Whether the rating service is reputable may be ascertained based on their reviews, their viewership/subscribers being above a certain threshold, such as ten million viewers, and/or their reputational ranking in their respective industry.

In yet another embodiment, "relevance" 630 is an exemplary factor that may be analyzed by the control circuitry 1004 to verify the companion media asset. In this embodiment, a determination is based on the relevance of the companion media asset to the search terms of the dynamic search template to determine whether the companion media asset can be trusted, and if so, trusted to what degree. Relevance of the companion media asset can be assessed by analyzing it using an artificial intelligence (AI) algorithm. For example, the AI algorithm may be used to analyze the context and contents of the companion media asset to determine if the companion media asset is relevant to the search conducted and also relevant based on the parameters used in the search template. In some embodiments, the metadata, such as topic or other keywords used, may be incorrectly applied to the companion media asset and as such the companion media asset may not be relevant.

In another embodiment, "Context" 640 is an exemplary factor that may be analyzed by the control circuitry 1004 to verify the companion media asset. In this embodiment, a determination is based on the context of the companion media asset. An algorithm may be used by the control circuitry 1004 to analyze the context of the companion media asset to determine if the companion media asset contextually can be trusted. If the context seems well written, written by a reputable source, contextually sound, then a higher trust factor may be associated with the companion media asset. A determination whether a source is reputable may be based on the number of subscribers of the source's, reputation ranking in their industry, or the number of mentions in regular news media.

In another embodiment, "Channel," 650 or "Platform" is an exemplary factor that may be analyzed by the control circuitry 1004 to verify the companion media asset. In this embodiment, a determination is based on the channel or platform on which the companion media asset is posted or made available to determine if the companion media asset can be trusted. For example, there are platforms and channels that have their own verification process. This may include a process to screen the uploaded media assets to ensure that only authentic media assets which have good quality content that meets the platform policies are allowed to be uploaded. If the companion media asset is discovered in the search on such platforms, then a higher trust score may be allocated to the companion media asset based on the reputation and trustworthiness of the channel or platform where they are posted.

In yet another embodiment, "Advertisements" 660 is an exemplary factor that may be analyzed by the control circuitry 1004 to verify the companion media asset. In this embodiment, a determination is based on the advertisements included in or associated with the companion media asset to determine by the control circuitry 1004 if the companion media asset can be trusted. For example, some highly well-known brands, such as Nike™ or Pepsi™, have a reputation for ensuring that their product is associated with other high-quality work and products and that they are not associated with work that does not pass their stringent quality standards. As such, if such an advertisement from such a reputable brand is included with the companion media asset, then the control circuitry 1004 would associate a higher trust score with the companion media asset. In some embodiments, a brand may be compared to a fortune 500 list to determine if it is reputable. In other embodiments, the brand may be compared to a well know list in the brand's domain/industry to determine if the brand is reputable, such as, for example, if the brand is a music label, then a list of record labels that were nominated for a Grammy™ Award or a Wikipedia™ Page that lists top record labels may be searched to determine if the record label is listed in such lists and as such has received a level of reputation.

Figure 7A:
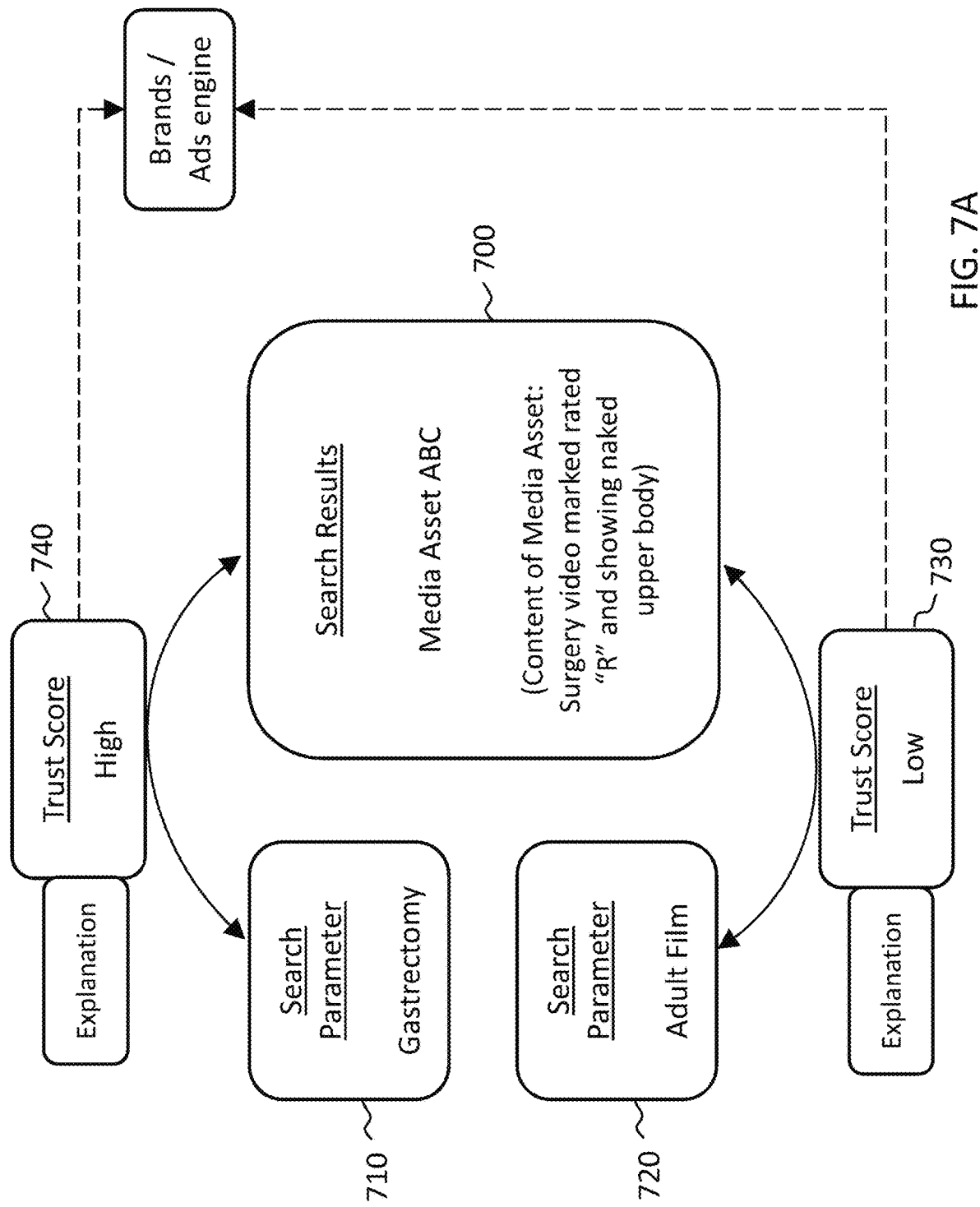
FIG. 7A is an exemplary block diagram for different trust scores allocated to the same media asset depending on the search term and the context, in accordance with some embodiments of the disclosure.
Figure 7B:
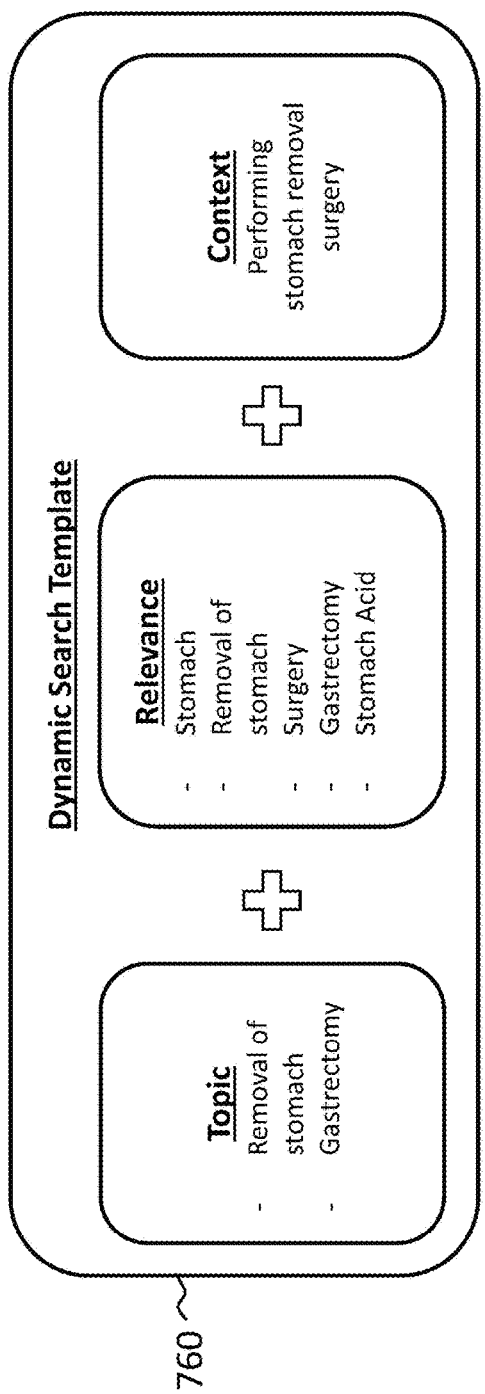
FIGS. 7B and 7C are exemplary dynamic search templates, in accordance with some embodiments of the disclosure.
Figure 7C:
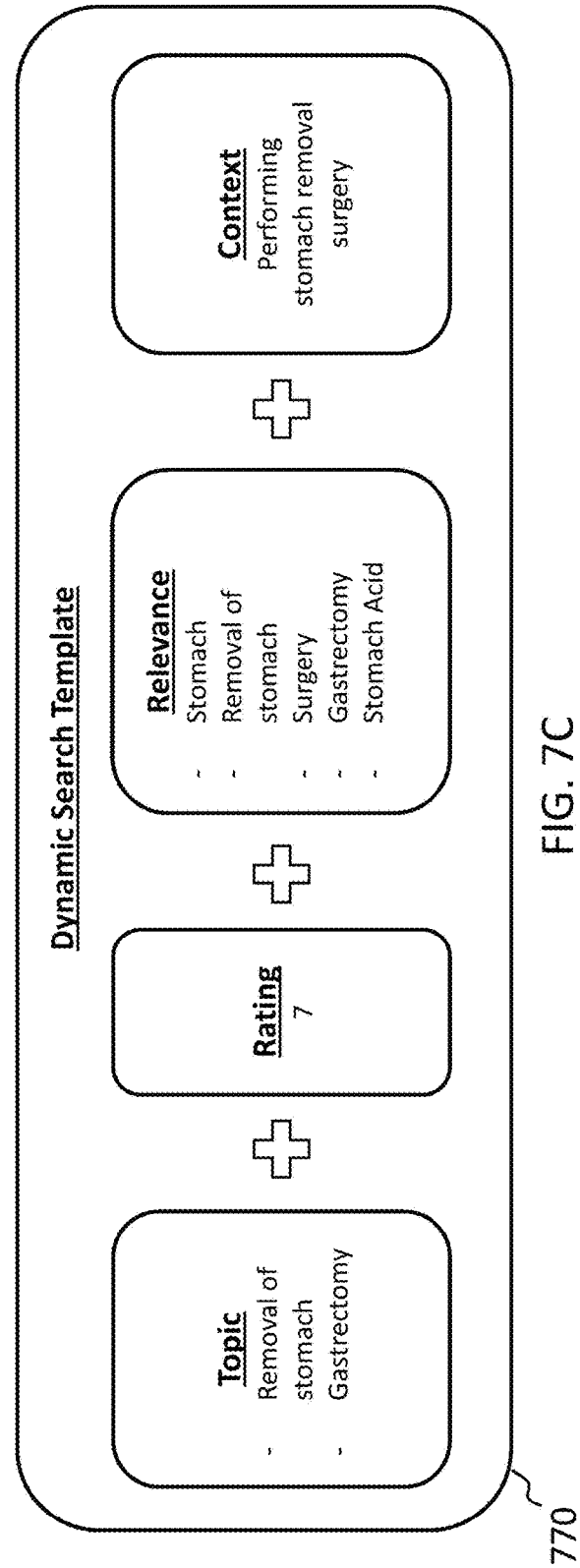

FIG. 7A is an exemplary block diagram where different trust scores are allocated to the same companion media asset depending on the search term and the context to search the companion media asset, in accordance with some embodiments of the disclosure.

In some embodiments, at block 710, a search is conducted by the control circuitry 1004 using a search term: "Gastrectomy." A dynamic search template that includes words that relate to the context of Gastrectomy may be generated as shown in FIGS. 7B and 7C. Since gastrectomy is a surgical procedure for removing a part of a person's stomach, as a natural byproduct of the surgery, a patient's body including their stomach might be shown in the operation.

In another embodiment lock 720, a search is conducted by the control circuitry 1004 based on a search term "Adult Film." Since adult films primarily contain nudity that is aimed at sexual pleasure of the viewer, a person's body may be shown in a certain way that is focused on providing sexual pleasure to the viewer.

In some embodiments, both searches from blocks 710 and 720 may return a search result that may include media asset "ABC" 700 which is a surgical video rated "R" and shows the naked upper body of a person. With respect to the first search at block 710, which was based on the search term "gastrectomy," the resulted media asset ABC found in response to the search may be given a higher trust score. The control circuitry 1004 may associate the higher score with matching of the factors of the companion media asset ABC, such as context, relevance and other factors depicted in FIG. 6, being matched contextually to the search term used in the dynamic search template. For example, the factor "context" of the media asset, which is a surgery video, is directly relevant to gastrectomy, which is also a type of surgery. As described earlier, techniques such as representing words by vectors may be utilized to ensure that all variations of the word are captured in the search and the resulting search terms are compared to the vectorized representation of the word to determine if they are related to the search terms. Accordingly, the system, through control circuitry 1004, may give a higher trust score at block 740 to the companion media asset ABC and also provide an explanation of why media asset ABC received the score that it did.

With respect to the second search at block 720, which was based on the search term "Adult Film," the resulted media asset ABC found in response to the search may be given a lower trust score by the control circuitry 1004 at block 730. The lower score may be given because the factors, such as context, relevance and other factors depicted in FIG. 6, do not contextually match the search term used in the dynamic search template. For example, although some nudity is shown in the media asset ABC, the nudity is not contextually related to sexual gratification or an adult film, instead is a byproduct of showing surgery.

In some embodiments, if the media asset 700 includes an advertisement from a reputable source, such as an advertisement from Harvard Medical School™ for a course in surgery, or an advertisement from Medtronic™ Inc, which is a reputable surgical tool supplier, then the advertisement being from a reputable source will be factored in by the control circuitry 1004 to determine the score of media asset ABC. In this case, since Harvard Medical School™ and Medtronic™ are highly reputable, the companion media asset ABC, because it includes an advertisement from the reputable source, will receive a high trust core when the search term gastrectomy is used.

FIGS. 7B and 7C depict an exemplary dynamic search templates, in accordance with some embodiments of the disclosure. In some embodiments, as depicted in FIG. 7C, the dynamic search template 760 is a combination of factors topic+relevance+context. When a companion video is requested, and the system, through its control circuitry 1004, causes the download of metadata at the play position, and a predetermined time before the play position, to be downloaded to the running buffer, as depicted in FIG. 1A. As explained earlier, the dynamic search template 760 is generated by the control circuitry 1004 based on this downloaded metadata. In operation, the system, using control circuitry 1004 of FIG. 10, analyzes the metadata, generates the dynamic search template, and includes the factors, a topic, relevance, and context, in the dynamic search template. These factors are used by the system, by applying artificial intelligence and NLP algorithms, to search for companion videos. When a companion video is found, its audio, video, and textual portions are analyzed and compared to the primary media asset to ensure that the companion video relates to the primary media assed based on topic, relevance, and context.

As depicted in FIGS. 7B and 7C, the topic of dynamic search template 760 is Gastrectomy or removal of stomach. The topic may be obtained based on the metadata provided by the provider. As mentioned earlier, the dynamic search template is based on the primary media asset, which may be provided for access on platforms such as Netflix™ HBOGO™, Hulu™, and other media outlets. In some embodiments, the provider, such as Netflix™, may list the title of the movie or provide metadata relating to the topic of the movie. In the event the topic is not provided by the provider, or other sources, such as system generated or through other metadata, then audio, video, and/or textual analysis may be performed by the control circuitry 1004, and processes using AI or NLP may be utilized, to determine the topic.

Likewise, the control circuitry 1004 may also determine the relevance and context either based on platform or provider generated metadata or by conducting audio, video, and/or textual analysis and processes the analyzed data using AI or NLP may be utilized, to determine the relevance and context. In some embodiment, the relevance parameters may include a combination of synonyms, antonyms, and other combination or words and phrases that contextually relate to the content of the primary media asset at the play position, and a predetermined time before the play position, when a request for companion video was made.

FIG. 7C depict another exemplary dynamic search template 770 which is a combination of topic+rating+relevance+context. In other words, dynamic search template 770 adds a rating parameter to the dynamic search template 760 of FIG. 7B. In some embodiments, rating is used by the control circuitry 1004 as a measuring gauge of which companion videos would be accepted as companions to the primary media asset. As such, as depicted in FIG. 7C, the companion video needs to be at least a "7" rating for the system to accept it as an acceptable companion video for the primary asset. All other search results of potential companion videos that fall below a "7" rating would not be considered. The rating may be modified by the user or the system on an as needed basis.

The dynamic search templates 760 and 770 use the factors topic+relevance+context or topic+rating+relevance+context as a basis for searching companion videos. The search results obtained in response to the search conducted by the control circuitry 1004 on a plurality of platforms and databases using batch files, as described in FIG. 4, are evaluated based on the parameters of the dynamic search template to determine if one of more of the search results may qualify as acceptable companion videos for the primary media asset.

FIG. 8 is an exemplary block diagram for modifying an original trust score based on context, in accordance with some embodiments of the disclosure. The figure depicts a companion media asset 800, to a primary media asset or segment of the primary media asset as depicted in FIG. 1A, that has received an original score of 1-10 by the control circuitry 1004 at block 810. The companion media asset may be accessed from database 805, which may be a online platform, such as YouTube™ where other users can upload companion videos. The original score of the companion video may be based on limited metadata and calculated by the control circuitry 1004 as depicted in block 820.

As shown in block 820, each category may be given a predetermined number/score by the control circuitry 1004, such as +/−1, +/−2 etc. The predetermined score may be determined either by the user or by the system. In one example, for this specific companion media asset 800, nudity received a −1 score, profanity received a −1 score, children's advertisement received a +2 score, and ESPN sports channel received a +2 score and the overall aggregated score for the companion media asset 800 received a +2 trust score.

In some embodiments, the trust score may be further analyzed based on the context of the companion media asset 800. For example, the content of the media asset includes a woman's tennis match between Serena Williams and Naomi Osaka. In this example, in response to an easy serve by Naomi, Serena who could have scored on the point instead made a silly error that costs her a point in the game. In frustration, Serena yelled out a curse word as an immediate reaction to missing the point. If the context is not taken into account, because it's a woman's tennis match where women usually wear skirts as part of the standard uniform, and because a profanity was yelled out, the companion media asset received a −1 for nudity and −1 for profanity. As depicted in block 820, the companion media asset also received a +2 for a children's advertisement and +2 for the media asset being displayed through ESPN sports which is a reputable channel for sports.

A further analysis may be conducted by the control circuitry 1004 for the companion media asset 800 based on the context. As part of the analysis, a determination may be made that the game being played is a women's tennis match and yelling was in response to losing a point. Since the nudity and profanity are not the primary focus and given the context may be somewhat appropriate, the lower trust score may be modified by the control circuitry 1004 to a higher trust score, such as from a 2 to a 6 as depicted in block 840.

In operation, words, phrases, and terms are analyzed by the control circuitry 1004, such as by using NLP or AI algorithms. The control circuitry 1004 may perform a search query for the companion media asset and extract words, phrases, and terms either by parsing the available metadata or by performing audio, video, and textual analysis. The words, phrases, and terms may be given a predetermined score, such as terms that relate to foul language, nudity, violence may be given a predetermined score and other words, phrases, and terms are also given a score. If the predetermined score is a "1," then the word associated with the score may receive a +1 or a −1 depending on its relation to the context.

FIGS. 9-10 describe exemplary devices, systems, servers, and related hardware for downloading metadata to a running buffer, dynamically generating a dynamic search template, such as in FIGS. 7B and 7C, based on the metadata downloaded, generating API batch requests, searching and identifying companion media assets based on the searches conducted on various platforms, verifying the companion media assets, accessing a trust score for the companion media assets, modifying the trust scores, and presenting a link to access the companion media asset and executing all the processes described herein, in accordance with some embodiment of the disclosure. In the system 900, there can be more than one user equipment device 902 but only one is shown in FIG. 9 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 906.

The user equipment devices may be coupled to communications network 906. Namely, the user equipment device 902 is coupled to the communications network 906 via communications path 904. The communications network 906 may be one or more networks including the Internet, a mobile phone network, mobile voice or data network (e.g., a 4G, 5G, or LTE network), cable network, public switched telephone network, or other types of communications network or combinations of communications networks. The path 904 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In some embodiments path 904 can be a wireless path. Communication with the user equipment device may be provided by one or more communications paths but is shown as a single path in FIG. 9 to avoid overcomplicating the drawing.

The system 900 also may include companion media asset sources, such as video asset sources 912, one or more servers 914, and one or more services, such as YouTube™ Vimeo™ that provide user-uploaded videos, which can be coupled to any number of databases providing information to the user equipment devices. The information sources 912 represent any computer-accessible sources, such as servers, databases, platforms (such as video sharing platforms) that store media assets, such as video assets. The server 914 may store and execute various software modules, such as for example for downloading metadata to a running buffer, dynamically generating a search template based on the metadata downloaded, generating API batch requests, searching and identifying companion media assets based on the searches conducted on various platforms, verifying the companion media assets, accessing a trust score for the companion media assets, modifying the trust scores, and presenting a link to access the companion media asset and executing all the processes described herein.

In some embodiments, the user equipment device 902, media asset sources 912, and server 914 may store metadata downloaded to a running buffer associated with media asset. In some embodiments, the server may transmit a command to cause the display of a user interface on the display screen of a media asset device or a user's mobile device. The user interface may be used by the user to select preferences, execute commands, and request companion video or additional content. The user interface may also be used by the system to display trust scores and links to access companion videos.

FIG. 10 shows a generalized embodiment of a user equipment device 1000, in accordance with some embodiments. In some embodiments, the user equipment device 1000, is the same user equipment device 902 of FIG. 9. The user equipment device 1000 may receive content and data via input/output (I/O) path 1002. The I/O path 1002 may provide audio content (e.g., broadcast programming, on-demand programming, Internet content, content available over a local area network (LAN) or wide area network (WAN), and/or other content) and data to control circuitry 1004, which includes processing circuitry 1006 and a storage 1008. The storage 1008 may store instructions for an application that when executed by a processor may perform the steps described in figures depicted herein. The control circuitry 1004 may be used to send and receive commands, requests, and other suitable data using the I/O path 1002. The I/O path 1002 may connect the control circuitry 1004 (and specifically the processing circuitry 1006) to one or more communications paths. I/O functions may be provided by one or more of these communications paths but are shown as a single path in FIG. 10 to avoid overcomplicating the drawing.

The control circuitry 1004 may be based on any suitable processing circuitry such as the processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The accessing of various online platforms, accessing of profiles of companion videos, downloading metadata to a running buffer, dynamically generating a search template based on the metadata downloaded, generating API batch requests, searching and identifying companion media assets based on the searches conducted on various platforms, verifying the companion media assets, accessing a trust score for the companion media assets, modifying the trust scores, and presenting a link to access the companion media asset and executing all the processes described herein, can be at least partially implemented using the control circuitry 1004. The processes as described herein may be implemented in or supported by any suitable software, hardware, or combination thereof. They may also be implemented on user equipment, on remote servers, or across both.

In client-server-based embodiments, the control circuitry 1004 may include communications circuitry suitable for communicating with one or more servers that may at least implement the storing of the profiles of companion media assets, verified profiles of the companion media assets, trust scores, metadata downloaded to the running buffer, links to access the companion videos, and related functions and processes as described herein. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 1008 that is part of the control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 1008 may be used to store various types of content described herein. Nonvolatile memory may also be used (e.g., to launch a boot-up routine and other instructions). Cloud-based storage, described in relation to FIG. 9, may be used to supplement the storage 1008 or instead of the storage 1008.

The control circuitry 1004 may include audio generating circuitry and tuning circuitry, such as one or more analog tuners, audio generation circuitry, filters or any other suitable tuning or audio circuits or combinations of such circuits. The control circuitry 1004 may also include scaler circuitry for upconverting and down converting content into the preferred output format of the user equipment device 1000. The control circuitry 1004 may also include digital-to-analog converter circuitry and analog-to-digital converter circuitry for converting between digital and analog signals. The tuning and encoding circuitry may be used by the user equipment device 1000 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 1008 is provided as a separate device from the user equipment device 1000, the tuning and encoding circuitry (including multiple tuners) may be associated with the storage 1008.

The user may utter speech to the control circuitry 1004, which is received by the microphone 1016. The microphone 1016 may be any microphone (or microphones) capable of detecting human speech. The microphone 1016 is connected to the processing circuitry 1006 to transmit detected voice commands and other speech thereto for processing. In some embodiments, voice assistants (e.g., Siri, Alexa, Google Home and similar such voice assistants) receive and process the voice commands and other speech.

The user equipment device 1000 may include an interface 1010. The interface 1010 may be any suitable user interface, such as a remote control, mouse, trackball, keypad, keyboard, touch screen, touchpad, stylus input, joystick, or other user input interfaces. A display 1012 may be provided as a stand-alone device or integrated with other elements of the user equipment device 1000. For example, the display 1012 may be a touchscreen or touch-sensitive display. In such circumstances, the interface 1010 may be integrated with or combined with the microphone 1016. When the interface 1010 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 1010 may be HDTV-capable. In some embodiments, the display 1012 may be a 3D display. The speaker (or speakers) 1014 may be provided as integrated with other elements of user equipment device 1000 or may be a stand-alone unit. In some embodiments, the display 1012 may be outputted through speaker 1014.

The user equipment device 1000 of FIG. 10 can be implemented in system 900 of FIG. 9 as user equipment device 902, but any other type of user equipment suitable for downloading metadata to a running buffer, dynamically generating a search template based on the metadata downloaded, generating API batch requests, searching and identifying companion media assets based on the searches conducted on various platforms, verifying the companion media assets, accessing a trust score for the companion media assets, modifying the trust scores, and presenting a link to access the companion media asset and executing all the processes described herein.

It may also be implemented in system 900 as user equipment device 902, but any other type of user equipment suitable for executing the functions and processes described herein. For example, user equipment devices such as television equipment, computer equipment, wireless user communication devices, or similar such devices may be used. User equipment devices may be part of a network of devices. Various network configurations of devices may be implemented and as discussed in more detail above. For example, although reference are made to control circuitry performing the analysis, other method, such as cloud services that are capable of performing metadata analysis in real-time to extract metadata are also contemplated.

The invention claimed is:

1. A method comprising:
generating for display a media asset on a media device of a user;
receiving a request to display additional content relevant to the media asset;
downloading metadata from the media asset based on a current play position of the media asset;
comparing a context of each downloaded metadata associated with the current play position to a context of the media asset to determine downloaded metadata associated with the current play position that is relevant to the media asset;
performing a search on a database based on the downloaded metadata associated with the current play position that is relevant to the media asset;
receiving a plurality of secondary media assets from the search;
comparing metadata of the plurality of secondary media assets to the downloaded metadata associated with the current play position that is relevant to the media asset to determine whether each of the plurality of secondary media assets are relevant to the media asset and have a content rating suitable for the user.

2. The method of claim 1, wherein the requested additional content relevant to the media asset is relevant to the current play position of the media asset.

3. The method of claim 1, wherein not all metadata downloaded from the media asset is relevant to the media asset, and wherein the determining downloaded metadata associated with the current play position that is relevant to the media asset is based on one or more of the user's profile or consumption history.

4. The method of claim 1, wherein not all metadata downloaded from the media asset is relevant to the media asset, and wherein the determining downloaded metadata associated with the current play position that is relevant to the media asset is based on comparing a context of the media asset to a context of each metadata item of the downloaded metadata.

5. The method of claim 1, wherein the performing the search on the database based on the downloaded metadata associated with the current play position that is relevant to the media asset further comprises generating a search template based on the downloaded metadata associated with the current play position that is relevant to the media asset.

6. The method of claim 1, further comprising:
accessing a trust score for each of the plurality of secondary media assets; and
modifying the each trust score based on the comparing the metadata of the plurality of secondary media assets to the downloaded metadata associated with the current play position that is relevant to the media asset.

7. The method of claim 6, wherein the each trust score for the plurality of secondary media assets is calculated based on a factor from a group consisting of: topic, rating, relevance, context, channel, platform, and advertisements.

8. The method of claim 1, wherein the performing the search on the database based on the downloaded metadata associated with the current play position that is relevant to the media asset further comprises:
dynamically generating a search template based on metadata currently stored in a running buffer of the media asset;
searching the database for the plurality of secondary media assets that match a topic term of the search template; and
in response to a match with the topic term of the search template:
generating for display a link to each of the plurality of secondary media assets stored in the database.

9. The method of claim 8, further comprising:
generating an application programming interface (API) batch request based on a plurality of parameters from the dynamically generated search template; and receiving search results for the plurality of secondary media assets in response to the API batch request.

10. The method of claim 9, wherein the API batch request comprises a plurality of individual API requests, wherein each API individual request is used for a specific platform.

11. A system comprising:
communication circuitry configured to access a media device; and
control circuitry configured to:
generate for display a media asset on a media device of a user;
receive a request to display additional content relevant to the media asset;
download metadata from the media asset based on a current play position of the media asset;
compare a context of each downloaded metadata associated with the current play position to a context of the media asset to determine downloaded metadata associated with the current play position that is relevant to the media asset;
perform a search on a database based on the downloaded metadata associated with the current play position that is relevant to the media asset;
receive a plurality of secondary media assets from the search;

compare metadata of the plurality of secondary media assets to the downloaded metadata associated with the current play position that is relevant to the media asset to determine whether each of the plurality of secondary media assets are relevant to the media asset and have a content rating suitable for the user.

12. The system of claim 11, wherein the requested additional content relevant to the media asset is relevant to the current play position of the media asset.

13. The system of claim 11, wherein not all metadata downloaded from the media asset is relevant to the media asset, and wherein the control circuitry is further configured to determine downloaded metadata associated with the current play position that is relevant to the media asset based on one or more of the user's profile or consumption history.

14. The system of claim 11, wherein not all metadata downloaded from the media asset is relevant to the media asset, and wherein the control circuitry is further configured to determine downloaded metadata associated with the current play position that is relevant to the media asset based on comparing a context of the media asset to a context of each metadata item of the downloaded metadata.

15. The system of claim 11, wherein the control circuitry is further configured to perform the search on the database based on the downloaded metadata associated with the current play position that is relevant to the media asset by generating a search template based on the downloaded metadata associated with the current play position that is relevant to the media asset.

16. The system of claim 11, wherein the control circuitry is further configured to:
access a trust score for each of the plurality of secondary media assets; and
modify the trust score based on the comparing the metadata of the plurality of secondary media assets to the downloaded metadata associated with the current play position that is relevant to the media asset.

17. The system of claim 16, wherein the control circuitry is further configured to calculate the each trust score for the plurality of secondary media assets based on a factor from a group consisting of: topic, rating, relevance, context, channel, platform, and advertisements.

18. The system of claim 11, wherein the control circuitry is further configured to perform the search on the database based on the downloaded metadata associated with the current play position that is relevant to the media asset by:
dynamically generating a search template based on metadata currently stored in a running buffer of the media asset;
searching the database for the plurality of secondary media assets that match a topic term of the search template; and
in response to a match with the topic term of the search template:
generating for display a link to each of the plurality of secondary media assets stored in the database.

19. The system of claim 18, wherein the control circuitry is further configured to:
generate an application programming interface (API) batch request based on a plurality of parameters from the dynamically generated search template; and receiving search results for the plurality of secondary media assets in response to the API batch request.

20. The system of claim 19, wherein the API batch request comprises a plurality of individual API requests, wherein each API individual request is used for a specific platform.

* * * * *